US012584780B2

(12) United States Patent
Strief et al.

(10) Patent No.: US 12,584,780 B2
(45) Date of Patent: Mar. 24, 2026

(54) METHODS, SYSTEMS, AND APPARATUSES FOR BULK MATERIAL METER CALIBRATION

(71) Applicant: DEERE & COMPANY, Moline, IL (US)

(72) Inventors: Jeremy M. Strief, Davenport, IA (US); Robert Kaldenbach, Davenport, IA (US); Mandar M Kale, Pune (IN); Sandeep Ekhe, Ahmednagar (IN); Pradeep Kale, Parbhani (IN); Prasad Manjrekar, Pune (IN); Elijah B. Garner, Bettendorf, IA (US); Andrew W. Harmon, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 652 days.

(21) Appl. No.: 17/810,066

(22) Filed: Jun. 30, 2022

(65) Prior Publication Data

US 2023/0314203 A1 Oct. 5, 2023

Related U.S. Application Data

(60) Provisional application No. 63/362,436, filed on Apr. 4, 2022.

(51) Int. Cl.
| | |
|---|---|
| *G01F 25/00* | (2022.01) |
| *A01C 15/00* | (2006.01) |
| *G01F 13/00* | (2006.01) |

(52) U.S. Cl.
CPC ........ *G01F 25/0092* (2013.01); *A01C 15/003* (2013.01); *G01F 13/001* (2013.01)

(58) Field of Classification Search
CPC .... G01F 13/001; G01F 25/0092; G01F 9/003; G01F 23/20; G01F 23/22; A01C 15/003;
(Continued)

(56) References Cited

U.S. PATENT DOCUMENTS

| | | | |
|---|---|---|---|
| 3,129,844 A | 4/1964 | Madison | |
| 4,216,730 A | 8/1980 | Noble | |

(Continued)

FOREIGN PATENT DOCUMENTS

| | | | |
|---|---|---|---|
| DE | 2843487 A1 | 4/1980 | |
| DE | 102012111144 A1 | 5/2014 | |

(Continued)

OTHER PUBLICATIONS

John Deere, Air-Seeding Equipment, ActiveCAI Brochure (2020), pp. 1-28.
(Continued)

*Primary Examiner* — John Fitzgerald
*Assistant Examiner* — Truong D Phan

(57) ABSTRACT

An example container for collecting bulk material dispensed from a meter during a calibration operation may include a canister comprising an open end to receive bulk material, a coupler configured to releasably couple to a meter, and at least one weight sensor extending between the enclosure and the coupler. The weight sensor may be configured to detect weight of the bulk material deposited into the enclosure via the open end.

27 Claims, 24 Drawing Sheets

(58) Field of Classification Search

CPC ......... A01C 7/081; A01C 7/107; A01C 7/105; A01C 7/102; A01C 19/02; A01C 21/005; A01B 79/005; G01N 2035/00207; G01N 2035/00217

USPC ........................................................ 73/1.36

See application file for complete search history.

(56) References Cited

U.S. PATENT DOCUMENTS

| | | | |
|---|---|---|---|
| 4,834,004 A | 5/1989 | Butuk et al. | |
| 4,896,615 A | 1/1990 | Hood, Jr. et al. | |
| 5,081,600 A | 1/1992 | Tump | |
| 5,574,657 A | 11/1996 | Tofte et al. | |
| 5,684,476 A | 11/1997 | Anderson | |
| 5,845,818 A | 12/1998 | Gregor et al. | |
| 6,220,312 B1 | 4/2001 | Hirsch et al. | |
| 6,584,424 B2 | 6/2003 | Hardt | |
| 6,732,667 B1 | 5/2004 | Wilson | |
| 7,205,490 B2 | 4/2007 | Van Mill et al. | |
| 7,500,814 B2 | 3/2009 | Meyer | |
| 8,082,809 B2 | 12/2011 | Luellen et al. | |
| 8,132,521 B2 | 3/2012 | Snipes et al. | |
| 8,281,724 B2 | 10/2012 | Snipes | |
| 8,408,478 B2 | 4/2013 | Wonderlich | |
| 8,434,416 B2 | 5/2013 | Kowalchuk et al. | |
| 8,678,347 B2 | 3/2014 | Maro | |
| 8,695,396 B2 | 4/2014 | Landphair et al. | |
| 8,931,995 B2 | 1/2015 | Fitzgerald et al. | |
| 9,043,096 B2 | 5/2015 | Zielke et al. | |
| 9,043,949 B2 | 6/2015 | Liu et al. | |
| 9,545,048 B2 | 1/2017 | Pickett et al. | |
| 9,591,799 B2 | 3/2017 | Henry | |
| 9,936,626 B2 | 4/2018 | Chahley et al. | |
| 10,379,547 B2 | 8/2019 | Thompson et al. | |
| 10,575,457 B2 | 3/2020 | Felton et al. | |
| 10,609,858 B2 | 4/2020 | Garner et al. | |
| 10,945,364 B2 | 3/2021 | Garner et al. | |
| 11,191,207 B2 | 12/2021 | Harmon et al. | |
| 2002/0139436 A1 | 10/2002 | Rosen et al. | |
| 2002/0170476 A1 | 11/2002 | Bogner et al. | |
| 2006/0231001 A1 | 10/2006 | Wilson | |
| 2007/0277714 A1 | 12/2007 | Wilson | |
| 2009/0090283 A1 | 4/2009 | Riewerts | |
| 2009/0110608 A1 | 4/2009 | Vierheilig et al. | |
| 2009/0271136 A1 | 10/2009 | Beaujot et al. | |
| 2011/0035163 A1 | 2/2011 | Landphair | |
| 2012/0036914 A1 | 2/2012 | Landphair et al. | |
| 2012/0103238 A1 | 5/2012 | Beaujot et al. | |
| 2012/0226461 A1 | 9/2012 | Kowalchuk | |
| 2013/0101384 A1 | 4/2013 | Cresswell et al. | |
| 2013/0317696 A1 | 11/2013 | Koch et al. | |
| 2013/0340610 A1 | 12/2013 | Maro | |
| 2014/0165890 A1 | 6/2014 | Graham | |
| 2014/0209000 A1 | 7/2014 | Henry | |
| 2015/0112556 A1 | 4/2015 | Meyer Zu Hoberge et al. | |
| 2015/0223390 A1 | 8/2015 | Wendte et al. | |
| 2016/0120097 A1 | 5/2016 | Chahley et al. | |
| 2016/0120106 A1 | 5/2016 | Zacharias et al. | |
| 2016/0120107 A1 | 5/2016 | Chahley et al. | |
| 2016/0161306 A1 | 6/2016 | Gervais et al. | |
| 2016/0304300 A1 | 10/2016 | Beaujot et al. | |
| 2019/0000011 A1 | 1/2019 | Gervais et al. | |
| 2019/0033895 A1 | 1/2019 | Thompson et al. | |
| 2019/0037764 A1 | 2/2019 | Garner et al. | |
| 2019/0082583 A1 | 3/2019 | Garner et al. | |
| 2019/0082585 A1 | 3/2019 | Felton et al. | |
| 2019/0082586 A1 * | 3/2019 | Harmon | A01C 7/107 |
| 2019/0380263 A1 * | 12/2019 | Harmon | A01C 7/124 |
| 2020/0275602 A1 | 9/2020 | Garner et al. | |
| 2021/0127563 A1 | 5/2021 | Harmon et al. | |
| 2022/0174858 A1 | 6/2022 | Harmon et al. | |

FOREIGN PATENT DOCUMENTS

| | | |
|---|---|---|
| EP | 0278251 A1 | 8/1988 |
| GB | 2029185 A1 | 3/1980 |

OTHER PUBLICATIONS

New Seeder Targets Small-Grain Producers, Farm Industry News, dated Mar. 30, 2017, pp. 1-10, [online], [retrieved on Feb. 16, 2022]. Retrieved from the Internet <URL: https://www.farmprogress.com/equipment/new-seeder-targets-small-grain-producers >.

Extended European Search Report and Written Opinion issued in European Patent Application No. 23163389.2, dated Jul. 28, 2023, in 09 pages.

German Search Report issued in application No. 102018214027.8 dated Apr. 28, 2020, 16 pages.

German Search Report issued in application No. 102018214065.0 dated May 23, 2019, 21 pages.

German Search Report issued in application No. 102018214067.7 dated Apr. 30, 2020, 20 pages.

John Deere, 1910 Air Cart Hydraulic Drive Meter Calibration, retrieved from <URL: http://www.youtube.com/watch?v=yNC-cYSZDvA, on Sep. 21, 2017, 2 pages.

New Holland, Product Calibration Procedures, 5 Working Operations Excerpt, undated admitted art, 9 pages.

USPTO Final Office Action issued in U.S. Appl. No. 15/711,840 dated Jun. 12, 2020, 118 pages.

USPTO Non-Final Office Action issued in U.S. Appl. No. 15/711,764 dated Jun. 27, 2019, 25 pages.

USPTO Non-Final Office Action issued in U.S. Appl. No. 15/711,840 dated Dec. 2, 2019, 84 pages.

Brazilian Office Action issued in Patent Application No. 1020180170856, dated Jun. 27, 2022, 08 pages.

* cited by examiner

2000

Start

2002

Operating a meter in a selected manner to dispense a sample of bulk material

2004

Weighing the sample of bulk material with a weight sensor

2006

Generating a fluid flow to transport the sample of bulk material to another location

2008

Ceasing the fluid flow

End

2204

2208

2202

2200

2400

| 2402 | 2404 | 2406 |
| --- | --- | --- |
| Commodity Type | Recommended Meter Roller | Maximum Meter Operating Speed |
| Type 1 | Black | 30 |
| Type 2 | Green | 60 |
| Type 3 | Orange | 100 |
| Type 4 | Yellow | 80 |

FIG. 24

METHODS, SYSTEMS, AND APPARATUSES FOR BULK MATERIAL METER CALIBRATION

CROSS-REFERENCE TO RELATED APPLICATIONS

This application claims the benefit of U.S. Provisional Application No. 63/362,436, filed Apr. 4, 2022, the entire contents of which are incorporated herein by reference.

FIELD OF THE DISCLOSURE

The present disclosure relates generally to meter calibration and, particularly, to calibration of volumetric meters for agricultural seeders.

BACKGROUND OF THE DISCLOSURE

Air seeding involves metering seed into an airstream generated by a fan. The metered seed is entrained in the airstream and directed towards an air seeding implement that distributes the airstream and entrained seed into a plurality of secondary airstreams with associated seed. The secondary airstreams and associated seed are directed into a furrow formed into the ground where the seed is deposited. The furrow is closed by the seeding implement.

SUMMARY OF THE DISCLOSURE

A first aspect of the present disclosure is directed to a container for collecting bulk material dispensed from a meter during a calibration operation. The container may include a canister comprising an open end to receive bulk material, a coupler configured to releasably couple to a meter, and at least one weight sensor extending between the enclosure and the coupler. The weight sensor may be configured to detect weight of the bulk material deposited into the enclosure via the open end.

A second aspect of the present disclosure is directed to a method for providing weight information of a bulk material dispensed by a meter into and sensed by a container coupled to the meter. The method may include coupling a container comprising a weight sensor to a meter such that bulk material dispensed from the meter is received into the container, sensing a weight of the dispensed bulk material received into the container with the weight sensor, and communicating the sensed weight of the bulk material, via electronic signals, to an electronic controller of the meter.

A third aspect of the present disclosure is directed to a computer-implemented method performed by one or more processors for automatically calibrating a bulk material meter. The computer-implemented method may include operating a bulk material meter to dispense an amount of bulk material into a container coupled to the meter, the container including an electronic weight sensor; sensing, with the electronic weight sensor, a weight of the bulk material received into the container; transmitting the sensed weight of the bulk material to an electronic controller of the meter; and calibrating the meter using the sensed weight of the bulk material.

The various aspects may include one or more of the following features. The canister may be moveable relative to the coupler. The container may include a stop that limits movement of the canister relative to the coupler. The container may include a guide coupled to the coupler. The guide may define a direction of movement of the canister relative to the coupler. The guide may define vertical movement of the canister relative to the coupler such that the canister is vertically movable relative to the coupler. The coupler may include a flange extending along at least a portion of the open end. The container may include a cavity formed between the coupler and the enclosure. The at least one weight sensor may be disposed in the cavity. The weight sensor may include a first end and a second end. The first end of the weight sensor may be connected to the coupler, and the second end may be connected to the canister. The first end and the second end of the weight sensor may be laterally offset from each other. The container may include an electrical connector configured to provide an electrical connection when the coupler is coupled to the meter. The electrical connector may communicate weight information associated with a weight of bulk material dispensed into the canister. The container may include a memory, communicably coupled to the at least one weight sensor, that stores weight information associated with a weight of the bulk material dispensed into the canister. The meter may include a plurality of meters. The canister may include a plurality of compartments, and each compartment may be positioned to receive bulk material from a corresponding meter of the plurality of meters.

The various aspects also may include one or more of the following features. A meter may be calibrated with an electronic controller using the sensed weight of the bulk material. Communicating the sensed weight of the bulk material, via electronic signals, to an electronic controller of the meter may include transmitting the sensed weight with an electrical connector of the container. Communicating the sensed weight of the bulk material, via electronic signals, to an electronic controller of the meter may include wirelessly transmitting the sensed weight. The meter may include an air seeder meter. The weight sensor may include a load cell. The container may include a canister and a coupler moveable relative to the canister. Sensing a weight of the dispensed bulk material received into the container with the weight sensor may include sensing an amount of displacement of the canister relative to the coupler in response to the bulk material received into the canister. An amount of displacement of the canister relative to the coupler may be limited.

The various aspects of the present disclosure may further include one or more of the following features. Operating a bulk material meter to dispense an amount of bulk material into a container coupled to the meter may include operating the meter a selected number of cycles or for a selected period of time. The container may include a coupler and a canister movable coupled to the coupler. Sensing, with an electronic weight sensor, a weight of the bulk material received into the container may include sensing an amount of displacement of the canister relative to the coupler. Transmitting the sensed weight of the bulk material to an electronic controller of the meter may include transmitting the sensed weight of the bulk material via a wired electrical connection between the electronic weight sensor and the electronic controller of the meter. The wired electrical connection may include an electrical connector of the container. Transmitting the sensed weight of the bulk material to an electronic controller of the meter may include transmitting the sensed weight of the bulk material via a wireless electrical connection between the electronic weight sensor and the electronic controller of the meter. Calibrating the meter using the sensed weight of the bulk material may include altering a rate of operation of the meter. The meter may be a volumetric meter. The electronic weight sensor may include a plurality of electronic weight sensors. Sensing, with an electronic weight sensor, a weight of the bulk material received into the container may include sensing a weight of the bulk material with the plurality of electronic weight sensors. Sensing a weight of the bulk material with the plurality of electronic weight sensors may include summing the sensed weights sensed by the plurality of electronic weight sensors.

Other features and aspects will become apparent by consideration of the detailed description and accompanying drawings.

BRIEF DESCRIPTION OF THE DRAWINGS

The detailed description of the drawings refers to the accompanying figures in which:

FIG. 24 is an example lookup table used to determine whether a selected roller is appropriate or recommended for a particular commodity, according to some implementations of the present disclosure.

DETAILED DESCRIPTION

Figure 1:
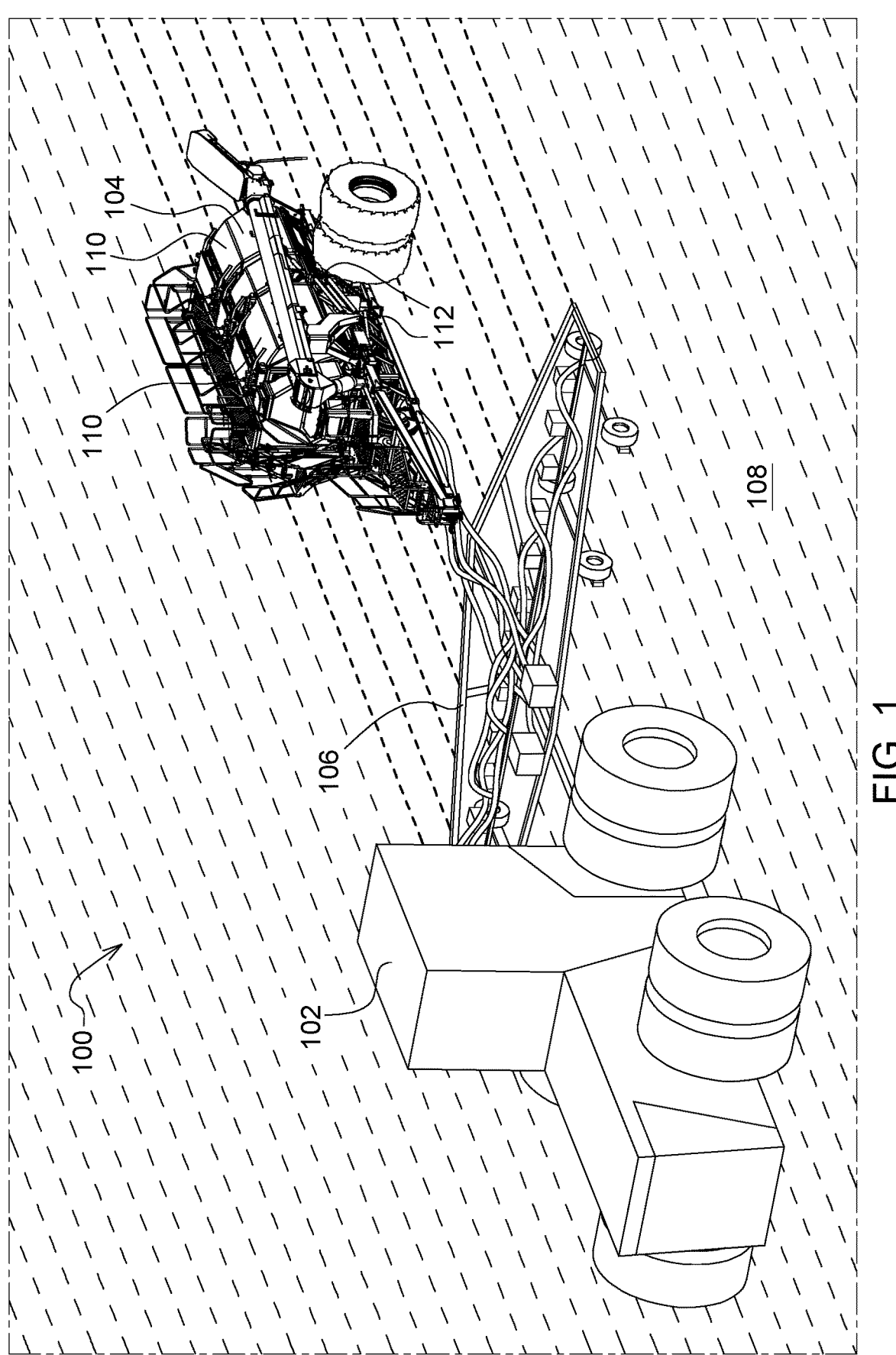
FIG. 1 is an oblique view of an example seeding train that includes a work vehicle, a seeding implement, and an air cart, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Words of orientation, such as "up," "down," "top," "bottom," "above," "below," "leading," "trailing," "front," "back," "forward," and "rearward," are used in the context of the illustrated examples as would be understood by one skilled in the art and are not intended to be limiting to the disclosure. For example, for a particular type of vehicle or implement in a conventional configuration and orientation, one skilled in the art would understand these terms as the terms apply to the particular vehicle or implement.

For example, as used herein, with respect to a work vehicle, unless otherwise defined or limited, the term "forward" (and the like) corresponds to a forward direction of travel of the work vehicle over the ground during normal operation of the work vehicle. Likewise, the term "rearward" (and the like) corresponds to a direction opposite the forward direction of travel of the work vehicle.

Also as used herein, with respect to an implement or components thereof (which includes carts, such as air carts), unless otherwise defined or limited, the term "leading" (and the like) indicates a direction of travel of the implement during normal operation (e.g., the forward direction of travel of a work vehicle transporting an implement). Similarly, the term "trailing" (and the like) indicates a direction that is opposite the leading direction.

The present disclosure is directed to calibrating meters, such as volumetric meters, of agricultural implements, such as air seeders, and encompasses any vehicle or machine that includes functionality for volumetrically metering seed, fertilizer, or other commodity. Particularly, the present disclosure encompasses systems, methods, and apparatuses for calibrating an air cart meter. Air seeders encompass agricultural implements that includes one or more tanks containing bulk material, e.g., seeds, fertilizers, or other commodity, for introduction to the ground, and one or more meters to dispense bulk material from the one or more tanks with or without ground engaging components, such as ground engaging components to form a furrow into which the bulk material is deposited or ground engaging components to close a furrow. The terms "bulk material" and "commodity" may be used interchangeably. Example air seeders include air carts and as well agricultural implements that integrate an air carts and a seeding implement. Consequently, the present disclosure is intended to encompass calibrating volumetric meters for any agricultural seeders, including air carts. Various examples are provided below in the context of air carts. However, the scope of the disclosure is not so limited. Rather, as explained earlier, the scope of the present disclosures encompasses other types of agricultural implements that utilize metering of a bulk commodity. For example, the scope of the present disclosure is applicable to planters with volumetric metering systems for seed, fertilizer or fertilizer spreaders, or any agricultural machine that volumetrically meters a commodity.

FIG. 1 is an oblique view showing a seeding train 100 that includes a work vehicle 102 (e.g., a tractor), an air cart 104 that carries bulk material (e.g., commodities such as seed and fertilizer) that are to be introduced into the soil of a field 108, and a seeding implement 106 that receives the bulk material from the air cart 104 and implants the bulk material into the ground. The air cart 104 includes tanks 110 and meters 112 that dispense bulk material from the tanks 110 in a controlled manner. Tanks, as used herein, are intended to encompass bins and other containers used to store bulk materials.

Figure 2:
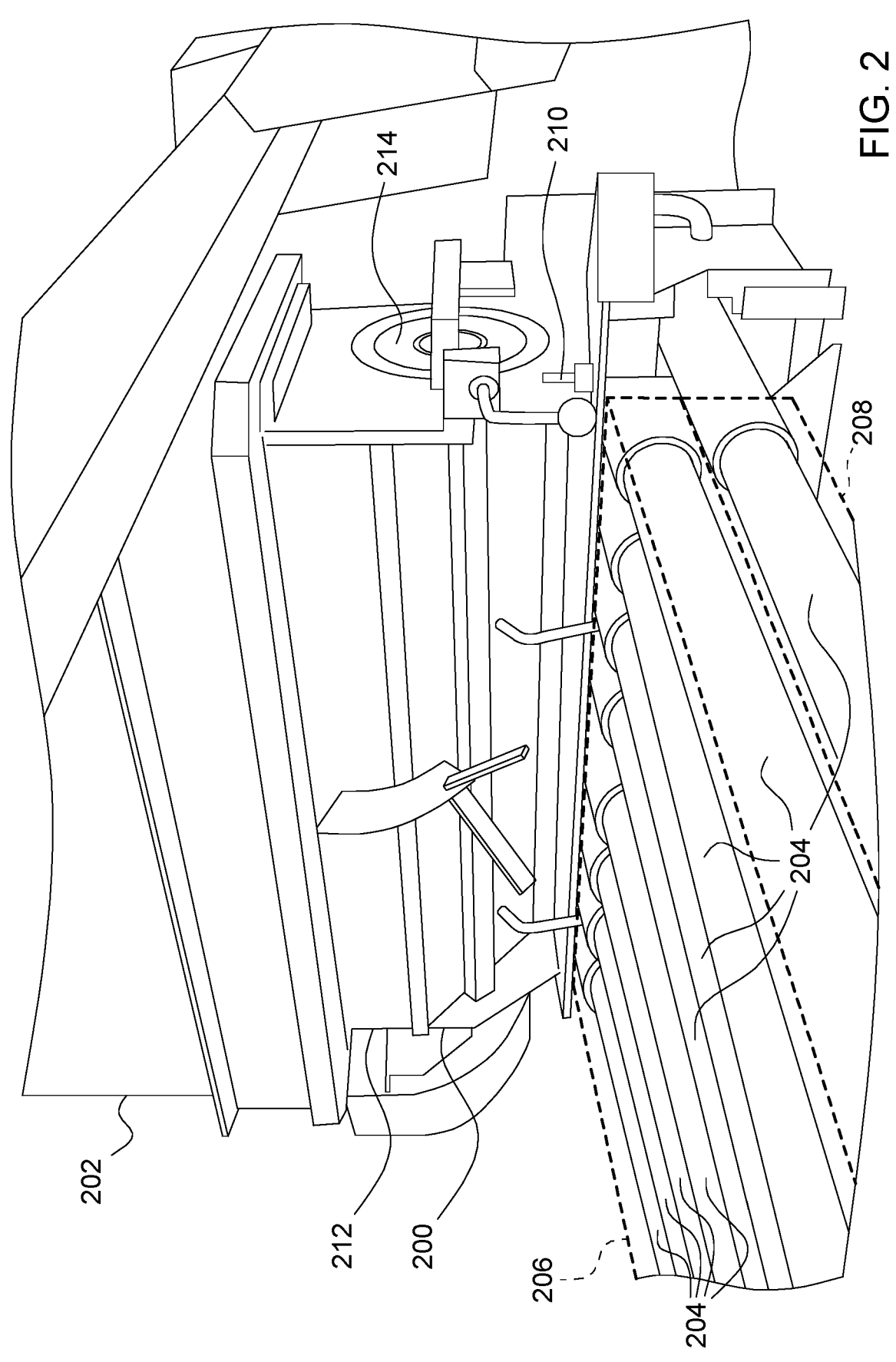
FIG. 2 is an oblique view of an example meter disposed adjacent to and in communication with the contents of a tank, according to some implementations of the present disclosure.

FIG. 2 is an oblique view of an example meter 200 disposed adjacent to and in communication with the contents of a tank 202, which may be similar to tank 110, of an air cart, such as air cart 104. The meter operates to dispense bulk material, e.g., seed, from a tank at a controlled rate in order to provide a desired amount of the bulk material to the air seeding implement. An amount dispensed by the meter 200 may be altered in response to, for example, a speed of the work vehicle, a size of the seeding implement (e.g., the number of row units of the seeding implement), and a desired rate of dispensing of seed into the ground.

The meter 200 dispenses seed to a plurality of conduits 204. In the illustrated example, the meter 200 is internally partitioned such that a bulk material, such as seed, dispensed from the tank 202 is divided into portions that are fed to the individual conduits 204. The conduits 204 provide a passage for an airstream that entrains the dispensed bulk material and conducts the entrained bulk material to a seeding implement, such as an air seeder, where the bulk material is introduced into the ground.

The conduits 204 are arranged in a first group 206 of laterally arranged conduits 204 and a second group 208 of laterally arranged conduits 204. In the context of FIG. 2, the second group 208 is located below the first group 206. A valve 210, such as a slide gate valve or flapper valve, directs the bulk material dispensed from the meter 200 to the first group 206 or the second group 208.

The example meter 200 includes a housing 212 and a cartridge 214 having a rotatable cylinder within the housing 212. The cylinder includes a plurality of cavities that collect a portion of the bulk material as the cylinder rotates. The bulk material collected in the cavities is released into the conduits 204 as the cylinder continues to rotate. As the rotational speed of the cylinder is altered, a rate at which the bulk material is released into the conduits 204 is correspondingly altered.

Figure 3:
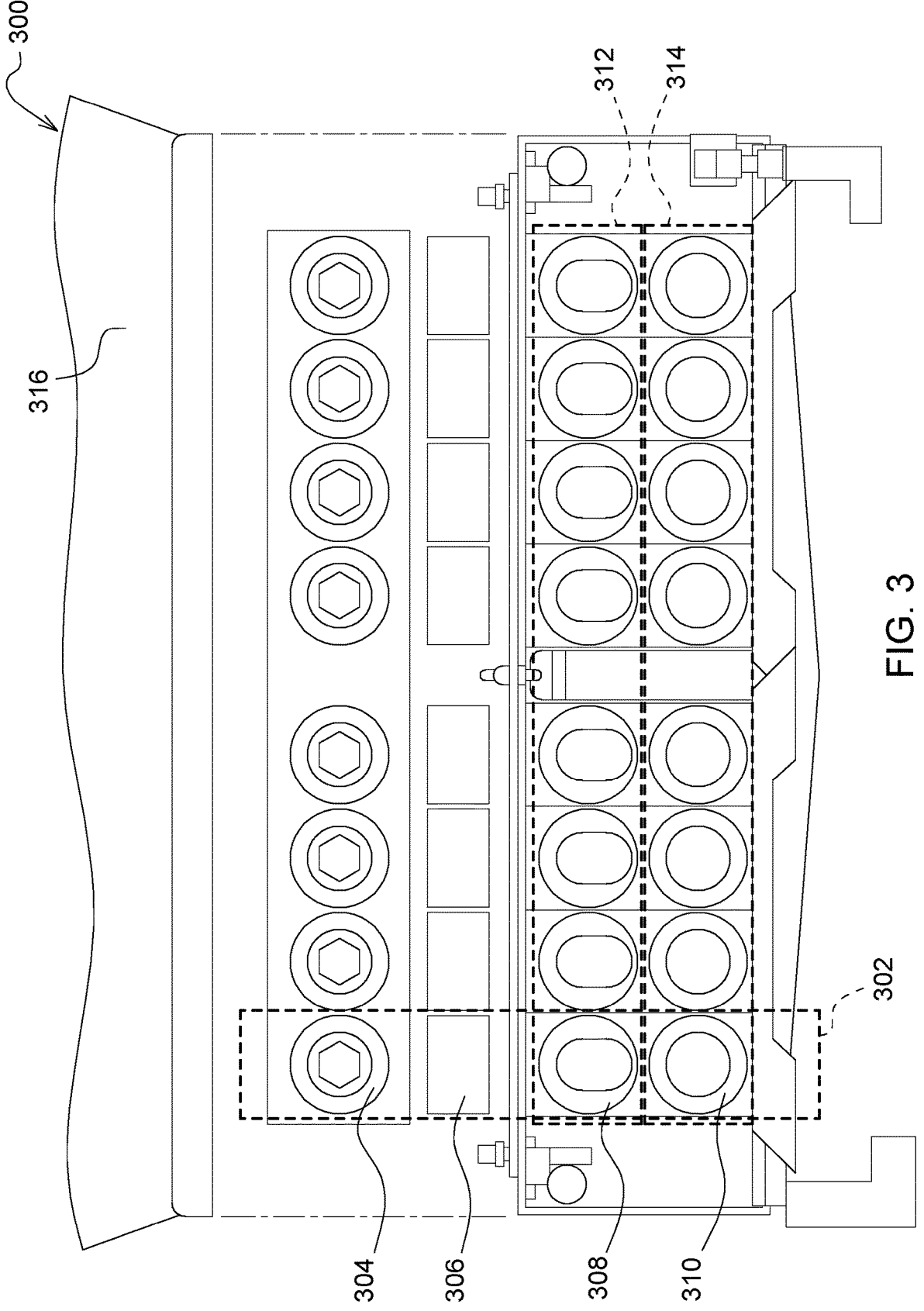
FIG. 3 is a schematic view of an example calibration system, according to some implementations of the present disclosure.

FIG. 3 is a schematic view of an example calibration system 300 within the scope of the present disclosure. Rather than a single meter that spans laterally across the conduits, FIG. 3 shows an example calibration system 300 that includes a plurality of individual meter arrangements 302. In the illustrated example, each meter arrangement 302 includes a meter 304, a valve 306, a first conduit 308, and a second conduit 310. The valve 306 is movable to direct dispensed bulk material from the meter 304 to the first conduit 308 or the second conduit 310. In some instances, the valve 306 is a slide gate valve or a flapper valve. The first conduits 308 form a first group 312, and the second conduits 310 form a second group 314. A bulk material agitator 316 feeds bulk material to the meters 304.

The apparatuses, systems, and methods described herein provide for improved calibration of a meter on an air cart. Conventionally, meter calibration for an air cart is a physically arduous and time-consuming operation. Conventional calibration efforts involve accessing a confined area, removing a cleanout door to permit dispensed bulk material to be collected, manually operating a meter, and disposing of the dispensed bulk. With the bulk material dispensed from the meter, a user removes a collection container used to collect the dispensed bulk material and weigh the collection container to determine the weight of the dispensed bulk material with a hand scale, such as a luggage scale or fish scale. In some instances, this process is repeated numerous times, such as to calibrate each meter, to get multiple data samples from each meter, or both. Additionally, measuring a weight of the dispensed bulk material can introduces error into the calibration process due, for example, to inaccuracy of the scale and using poor or inconsistent measuring techniques.

The measured weight of bulk material collected in the collection container is then utilized to calibrate the meter. For example, the number of revolutions along with the associated weight of the bulk material dispensed as a result of those revolutions of the meter are used to determine a calibration factor. The calibration factor is inputted into a controller of the air cart to control operation of the meter to control a rate at which bulk material is dispensed during an agricultural operation. In some instances, the calibration factor is in the form of a meter displacement value (MDV) that relates an amount of bulk material (which may be in the units of weight, mass, or volume) dispensed in response to selected condition, such as a selected interval. A selected interval includes, for example, a number of revolutions of a meter, such as at a selected rotational speed, or a selected amount of time of operation of a meter at a selected rotational speed. For example, an MDV may be in the form of a number of pounds of bulk material that is dispensed per a selected number of revolutions of the meter, e.g., 0.60 pounds per revolution (lb./rev.) (0.27 kilograms per revolution (kg/rev.)) or 0.50 cubic feet per revolution (ft$^3$/rev.) (0.01 cubic meters per revolution (m$^3$/rev.)). An MDV may be used in combination with a selected bulk material application rate (e.g., an amount of bulk material to be dispensed per distance) to control a rate of operation of a meter. Further, the ground speed of a vehicle can also be incorporated, along with the MDV and selected application rate, to control a rate of operation of a meter to dispense a bulk material at a desired rate based on ground speed. Thus, as the ground speed varies, a rate of operation of the meter is controlled, such as with an electronic controller, to vary an amount of bulk material dispensed so as to dispense the bulk material according to the selected application rate.

As a result, the conventional approach to calibrating a meter of an air cart is time consuming, laborious, and fatiguing. Further, the seeding operation is delayed until the calibration process is completed, and, without accurately calibrating the meter, dispensing of the bulk material during a seeding operation in controlled fashion is not possible. Additionally, hand operation of the meter and manual weight measurement introduce the risk of inaccurate calibration values.

The present disclosure provides for numerous implementations for improved meter calibration.

Figure 4:
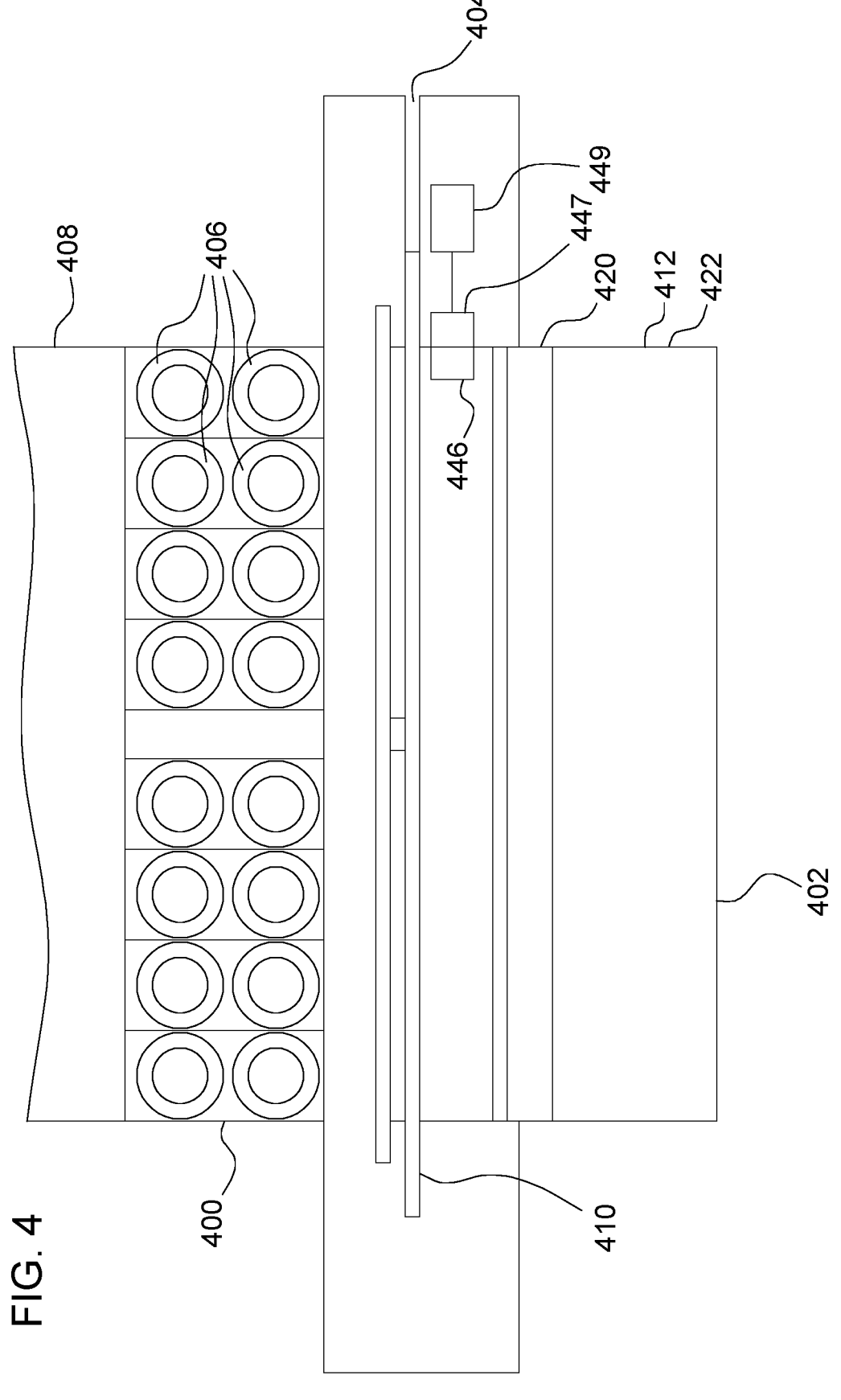
FIG. 4 is a schematic view of a portion of an air cart with an example collection container attached thereto, according to some implementations of the present disclosure.

FIG. 4 is a schematic view of a portion of an air cart 400 with an example collection container 402 attached thereto. In the illustrated example, the collection container 402 is received into a slot 404 formed in the air cart 400. However, the collection container 402 may be attached in other ways, such as one or more hangers, interlocking components, or one or more fasteners. The collection container 402 is configured to be releasably coupled to the air cart 400. The collection container 402 resides below conduits 406 (which may be similar to conduits 204, 308, and 310) and meter 408. The meter 408 may be similar to meter 200 or meter 304.

Referring to FIGS. 4 through 7, the collection container 402 includes a flange 410, a canister 412 received in an opening 414 formed in the flange 410, and a plurality of weight sensors 416 disposed between the canister 412 and the flange 410. The flange 410 forms a coupler that couples the collection canister 402 to the air cart 400 (such as by receipt into the slot 404) or any other structure from which the collection container 402 is to receive material or is to position the collection container 402 to receive material from a meter, such as meter 408. The canister 412 includes a carrier 420 and a receptacle 422 coupled to the carrier 420. Bulk material dispensed from the meter 408 passes through opening 414 and is collected in the canister 412. In some instances, the carrier 420 and the receptacle 422 form an integral component. In other implementations, the receptacle 422 is removable from the carrier 420. For example, in some implementations, the carrier 420 is formed from a rigid material, such as metal (e.g., steel or aluminum), and the receptacle 422 is formed form a flexible material, such as fabric or plastic.

Figures 5, 6:
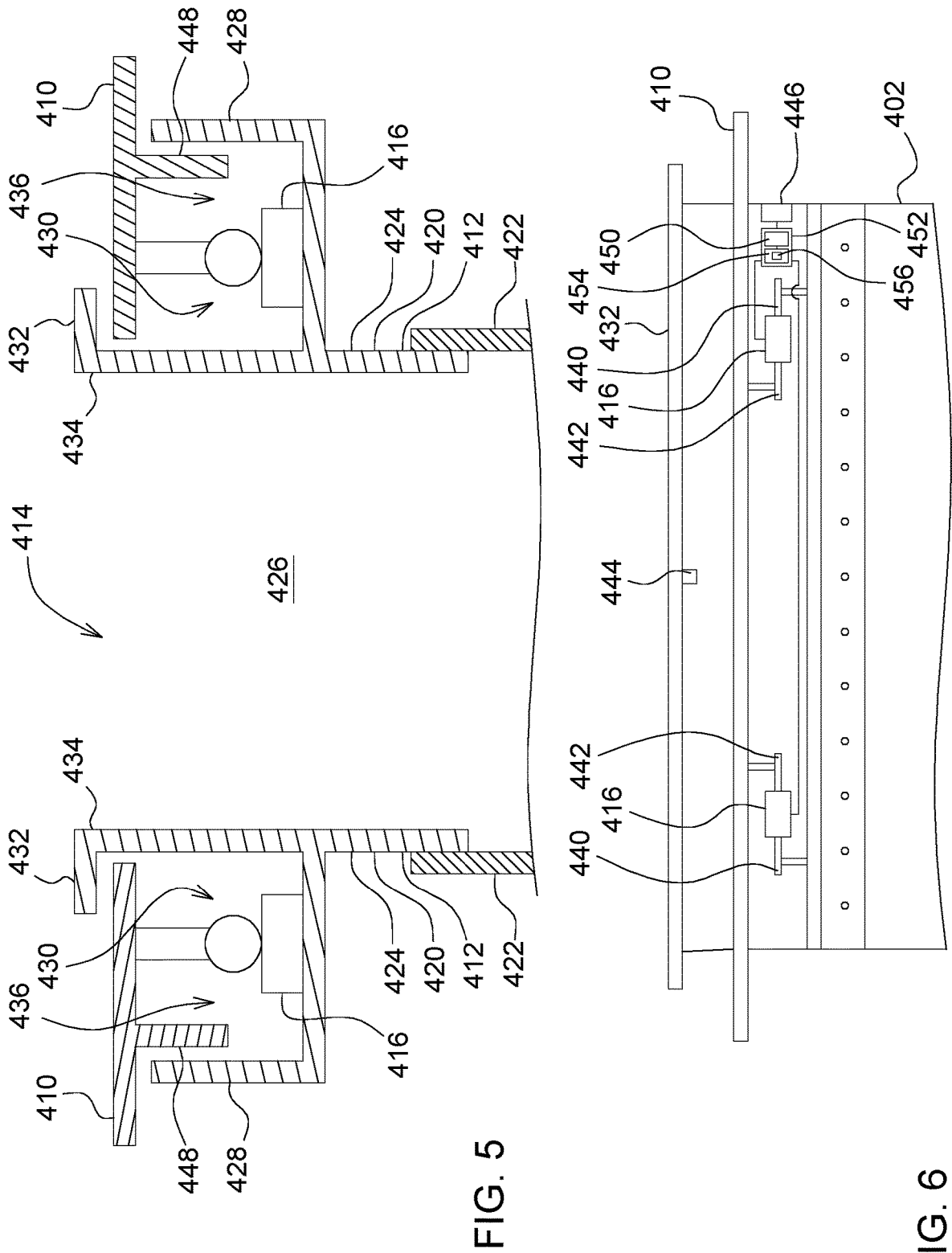
FIG. 5 is a cross-sectional view of a portion of the collection container of FIG. 4.
FIG. 6 is a front view of a portion of the collection container of FIG. 4.
Figure 7:
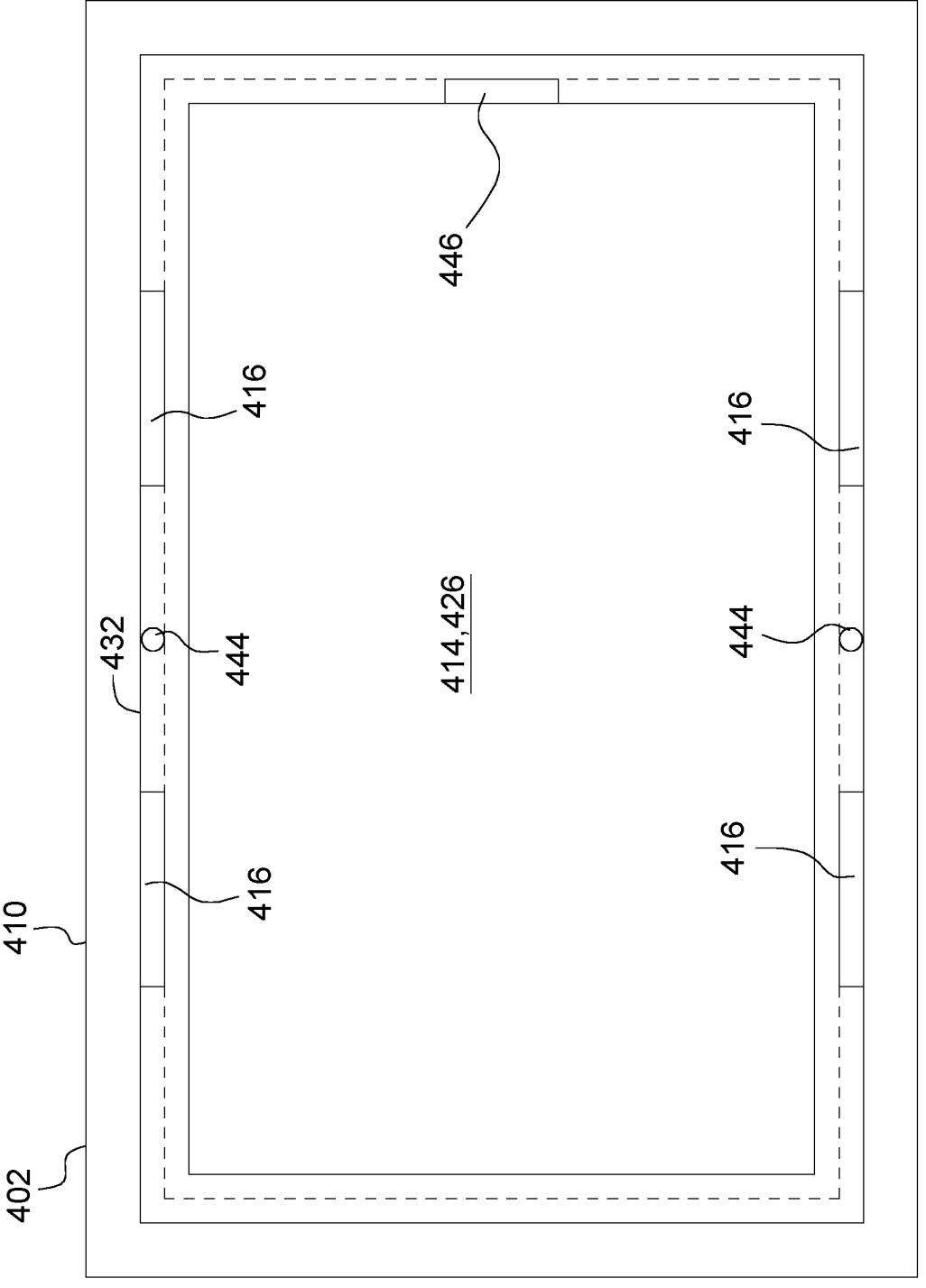
FIG. 7 is a top view of the collection container of FIG. 4.

As shown in the side cross-sectional view of FIG. 5, the carrier 420 includes sides 424 that form a passage 426. L-shaped beams 428 extend laterally along two opposing sides 424. The beams 428 define a cavity 430. A flange 432 extends from ends 434 of the sides 424. The flange 410 extends along open ends 436 of the cavity 430 between the flange 432 and the beams 428. The weight sensors 416 are disposed in the cavities 430. The weight sensors 416 sense weight of the canister 412 and any contents within the canister 412. In some implementations, the weight of the carrier 420 and the receptacle 422 are treated as a tare weight and subtracted from a weight sensed by the weight sensors 416. In some instances, the weight of the carrier 420, the receptacle 422, and anything residing with the receptacle 422 are treated as a tare weight prior to a sample of bulk material being dispensed into the canister 412. In this way, the weight of bulk material dispensed into the canister 412 is determinable. For example, in some instances, a weight of the receptacle 422 and any contents thereof are stored in memory (such as memory 450, described in more detail below) as a first sensed weight. A weight of the receptacle 422 is sensed after a sample of bulk material is subsequently deposited, and this second sensed weight can be stored in memory. A processor (such as processor 454, described in more detail below) determines the weight of the dispensed sample of bulk material by subtracting the first sensed weight of the receptacle 422 from the second sensed weight of the receptacle 422.

As shown in FIG. 6, a first end 440 of the weight sensors 416 is coupled to the carrier 420 of the canister 412 and a second end 442 of the weight sensors 416 is coupled to the flange 410. In this way, the canister 412 is moveable relative to the flange 410, and the weight sensors 416 detect the displacement and, thus, detect a weight of the bulk material introduced into the collection container 402. In some implementations, the weight sensors 416 are load cells. In other implementations, the weight sensors are other types of sensors operable to detect weight or mass of an object, e.g., strain-based sensors. Still further, in some implementations, other types of sensors are used to determine a weight, mass, or volume of a bulk material being measured, such as pressure sensor, displacement sensors, deflection sensors, or volume measurement sensors. In some implementations, the collection container 402 includes four weight sensors 416. In other implementations, the collection container 402 may include additional or fewer weight sensors 416. For example, in some instances, the collection container 402 includes a single weight sensor 416.

The collection container 402 includes stops 444 that limits displacement of the canister 412 relative to the flange 410. In some implementations, one or more fasteners (e.g., bolts) form the stops 444. In some instances, the stops 444 may prevent damage to the weight sensors 416 caused by excessive weight introduced into the collection canister 402. In some implementations, a position of the stops 444 is selectable to affect an amount of displacement of the canister 412 relative to the flange 410.

The flange 410 includes guides 448, such as in the form of walls extending along the flange 410. The guides 448 extend into and along the cavities 430. The guides 448 define a direction of movement of the canister 412 relative to the flange 410. In the illustrated example, the guides 448 permit a general vertical movement of the canister 412 relative to the flange 410 and, thus, limit lateral movement of the canister 412 relative to the flange 410.

As also shown in FIG. 6, the example collection container 402 also includes an electrical connector 446 that is adapted to interface with a counterpart connector 447 (shown in FIG. 4) located on the air cart 400. The weight sensors 416 are communicably coupled to the electrical connector 446, such as via a wired or wireless connection. The sensor outputs from the weight sensors 416 are transmitted to the air cart 400, such as to an electronic controller 449 of the meter 408 (shown in FIG. 4) where, in some implementations, the sensed weight of the bulk material deposited into the collection container 402 is used to calibrate the meter 408. In some implementations, the electronic controller 449 is a computer system similar to computer system 2100, discussed below. In some implementations, the electronic controller 449 of the meter 408 utilizes a number of cycles operated by the meter 408 to dispense a sample of bulk material into the collection container 402 and the weight of the dispensed sample of bulk material to calibrate operation of the meter 408. In some instances, the meter is operated at a selected speed for the selected number of cycles. In other implementations, the electronic controller 449 operates the meter 408 for a selected period of time to dispense bulk material and uses the time period of operation and weight of dispensed bulk material associated therewith to calibrate operation of the meter 408.

The sensor output from each of the weight sensors 416 represents a weight sensed by the respective weight sensor 416. In some implementations, the collection container 402 includes a memory 450, which may be similar to memory 2107 described below, communicably coupled to the weight sensors 416. The memory 450 stores the sensor output from the weight sensors 416 and, thus, the weight of the collection container 402.

In some implementations, the memory 450 forms part of a computer system 452 similar to the computer system 2100 described in more detail below. The computer system 452 includes a processor 454 that is communicably coupled to the memory 450. The processor 454 may be similar to processor 2105, described in more detail below. The memory 450 communicates with the processor 454 and is used to store programs and other software, information, and data. The processor 454 is operable to execute programs and software and receive information from and send information to the memory 450. Although a single memory 450 and a single processor 454 are illustrated, in other implementations, a plurality of memories, processors, or both may be used. Although the processor 454 and the memory 450 are shown as being local components of the computer system 452, in other implementations, one or both of the processor 454 and memory 450 may be located remotely.

Software 456, such as in the form of an application or program, is executed by the processor 454, for example, to sum the weights sensed by the weight sensors 416 to determine a total weight of the bulk material received into the collection container 402. In other instances, the computer system 452 receives the manner of operation of the meter 408 (e.g., a number of cycles that the meter 408 operates) and determines a calibration factor (e.g., an MDV) using the manner of operation (e.g., number of cycles) and the total weight of the bulk material sensed by the weight sensors 416. In some implementations, the calibration factor is stored in memory 450. In some implementations, the computer system 452 accounts for the tare weight of the collection container 402. For example, in some instances, the computer system 452 senses a weight of the canister 412 of the collection container prior to operation of the meter 408 (referred to as the "tare weight"), stores the tare weight (which may be in the form of a plurality of weight outputs from the plurality of weight sensors 416), subtracts the tare weight from the weight sensed by the weight sensors 416 after operation of the meter 408, and stores the resulting weight. The result is that the weight of the bulk material dispensed by the meter during the selected manner of operation (e.g., the number of cycles of operation) is determined. In other implementations, this determination is performed offboard of the collection container 402, such as by a meter controller (e.g., the electronic controller 449) that controls calibration and operation of the meter 408. In some implementations, computer system 452 calibrates the meter 408.

In some implementations, the computer system 452 also includes one or more input devices to provide input, such as by a user, to the computer system 452. Example input devices include a keyboard, keypad, a mouse, or a joystick. The computer system 452 may also include a display to display information regarding the computer system 452, such as weight information or a time period or a number of cycles that a meter is to be operated or has operated. In some instances, the display is a touch screen display, and a user can interface with the touch screen display by touching a screen of the touch screen display, to input information into the computer system 452. In some instances, the user interacts with the touch screen display via a graphical user interface (GUI) to provide input to the computer system 452. GUIs included within the scope of the present disclosure are described in more detail below.

In some implementations, the memory 450 is operable to store different weight output values from the different weight sensor 416 at different times. These different weight output values are used to identify a tare weight of the collection container and the weight of the collection container after a sample of bulk material has been dispensed from the meter 408. Additional weight output values can be stored after each operation of the meter 408 so that the weights of different bulk material samples can be accurately determined. By storing weight output values in this way, multiple bulk material samples can be sequentially dispensed by the meter 408 without having to remove and empty the collection container 402. As a result, a series of meter calibration samples can be output continually, saving time and effort.

In some implementations, one or more of the individual weight values sensed by each weight sensor 416, the total weight sensed by all of the weight sensors 416, the manner of operation of a meter, or the determined calibration factor (e.g., MDV) are transmitted, via the electrical connector 446 or via a wireless connection, from the computer system 452 or the memory 450, as the case may be, via the electrical connector 446 or via wireless connection, to a meter controller that controls operation of the meter 408. In some implementations, the meter controller is provided onboard of the air cart 400. In other implementations, the meter controller is provided offboard of the air cart 400. In some implementations, the meter controller may be provided on a work vehicle, which may be similar to work vehicle 102, that guides the air cart 400 through a field. The meter controller uses the information provided by the memory 450 or computer system 452, as the case may be, to calibrate the meter 408. In still other implementations, the computer system 452 or controller 449 functions as a meter controller to control operation of a meter using the determined calibration factor.

Figure 8:
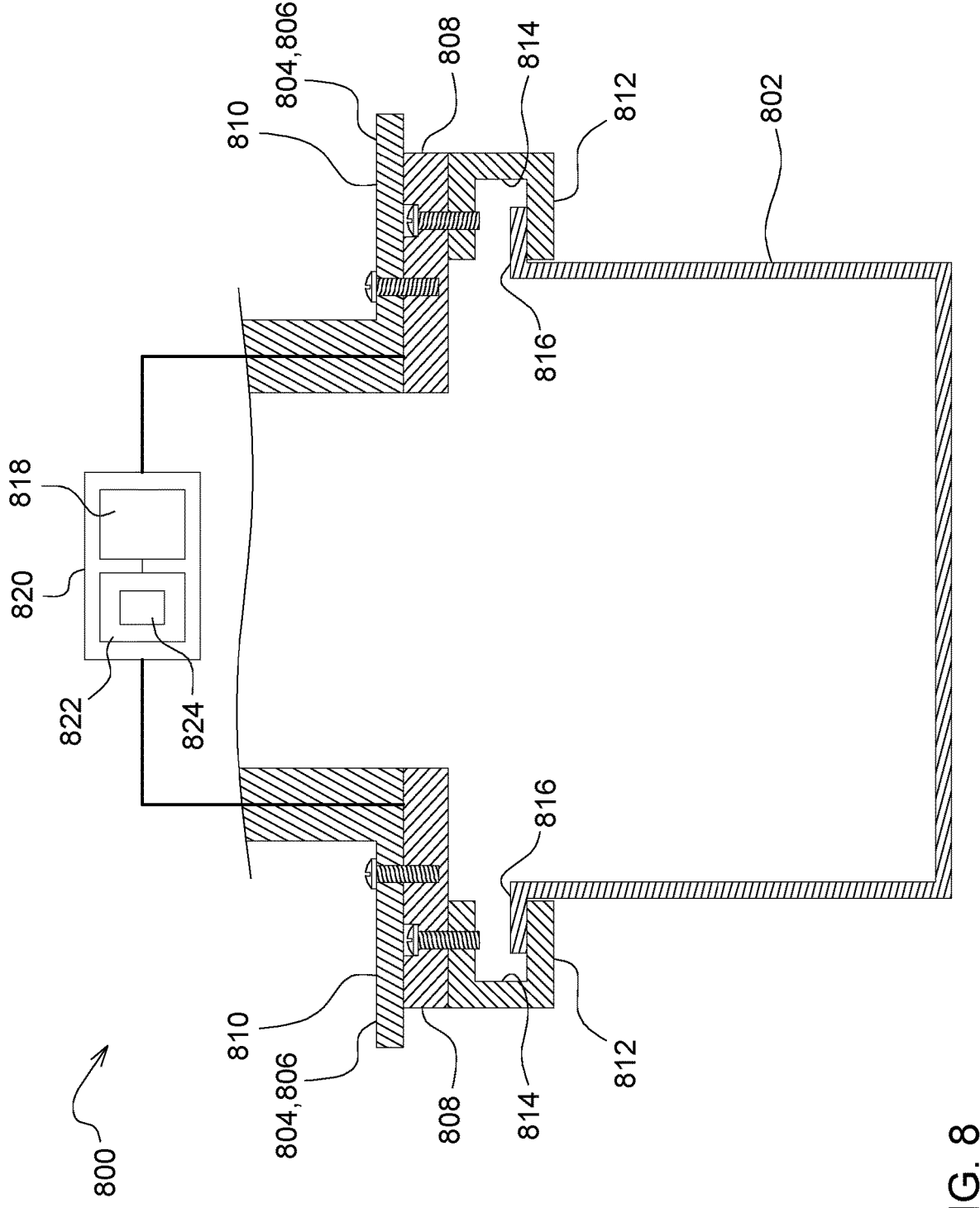
FIGS. 8 and 9 are schematic views of an example interface between a collection container and a machine, according to some implementations of the present disclosure.
Figure 9:
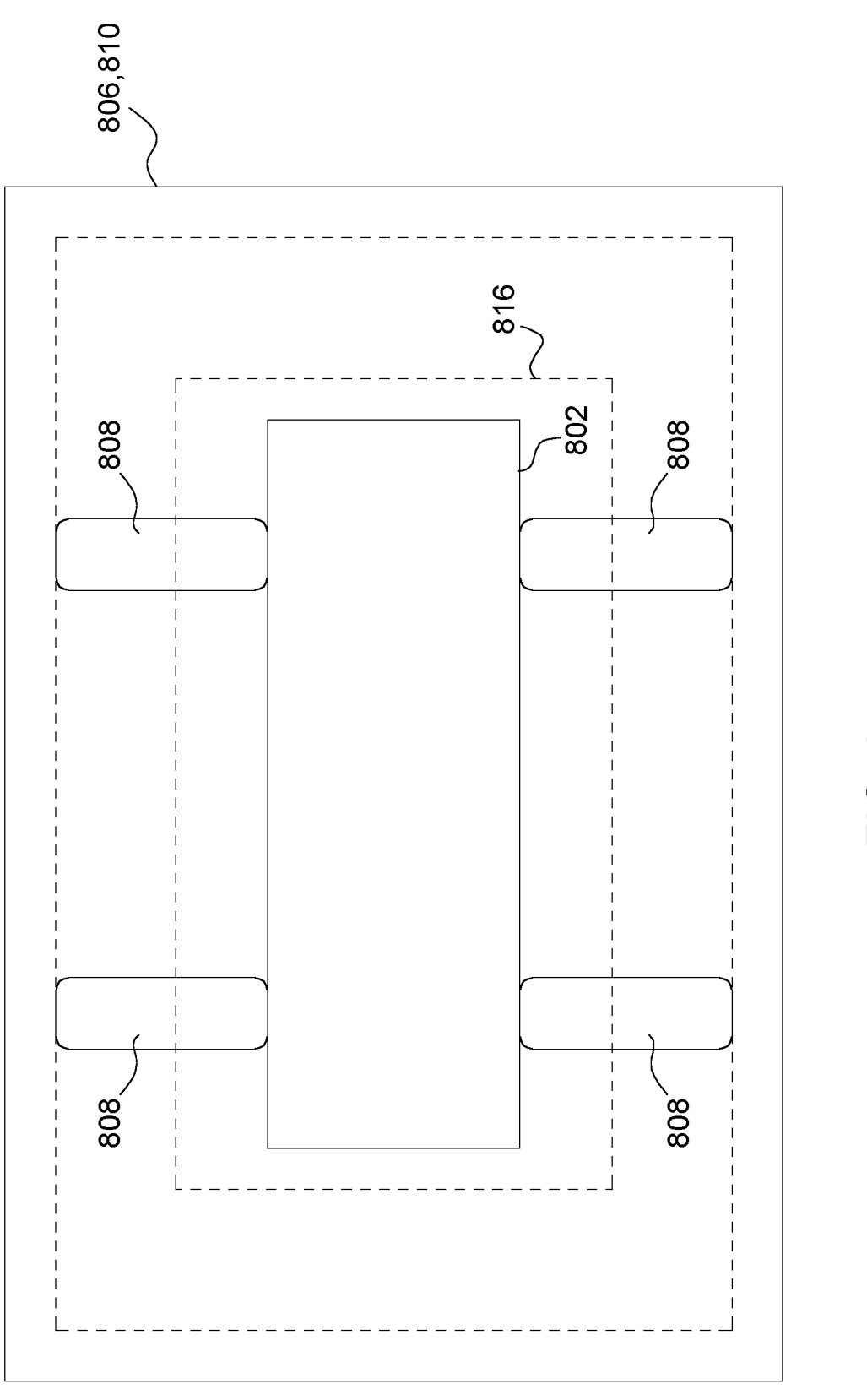

FIGS. 8 and 9 illustrate an example of an interface 800 between a collection container 802 and a vehicle 804, such as an air cart, containing one or more meters (e.g., volumetric meters). The interface 800 includes a mount 806, weight sensors 808 incorporated into the mount 806, and the collection container 802 removably couplable at the mount 806. Although four weight sensors 808 are shown, additional or fewer weight sensors 808 may be used. The mount 806 includes flanges 810, and holders 812. The weight sensors 808 are disposed between the respective flanges 810 and holders 812. In the illustrated example, the holders 812 define slots 814. A flange 816 of the collection container 802 is removably received into the slots 814. The weight sensors 808 are communicably coupled to a memory 818 for storing weight information from the weight sensors 808. The weight information corresponds to a weight of the collection container 802 and the contents thereof. In some implementations, the memory 818 forms part of a computer system 820, which may be similar to the computer system 452, described above, and the computer system 2100, described in more detail below. The computer system 820 having a processor 822 executing software 824 provides functionality similar to that described above in the context of computer system 452. Similar to the computer system 452, the computer system

820 may include one or more input devices and one or more displays. In some instances, the computer system 820 utilizes one or more sensed weights of the dispensed bulk material and manner of operation of the meter (e.g., the number of cycles of operation of a meter or a time period of operation) to calibrate the respective meter. In other implementations, the memory 818 or computer system 820 transmits one or more of weight information of dispensed bulk material, the details regarding the manner of operation of the meter to dispense the bulk material (e.g., the number of cycles of operation or time period of operation of the meter), and a calibration factor associated with a meter (e.g., an MDV) to another location, such as to a controller of the meter, where the meter is calibrated. In some instances, the computer system 820 represents the meter controller, and the computer system 820 uses the meter information to control operation of the meter.

Figure 10:
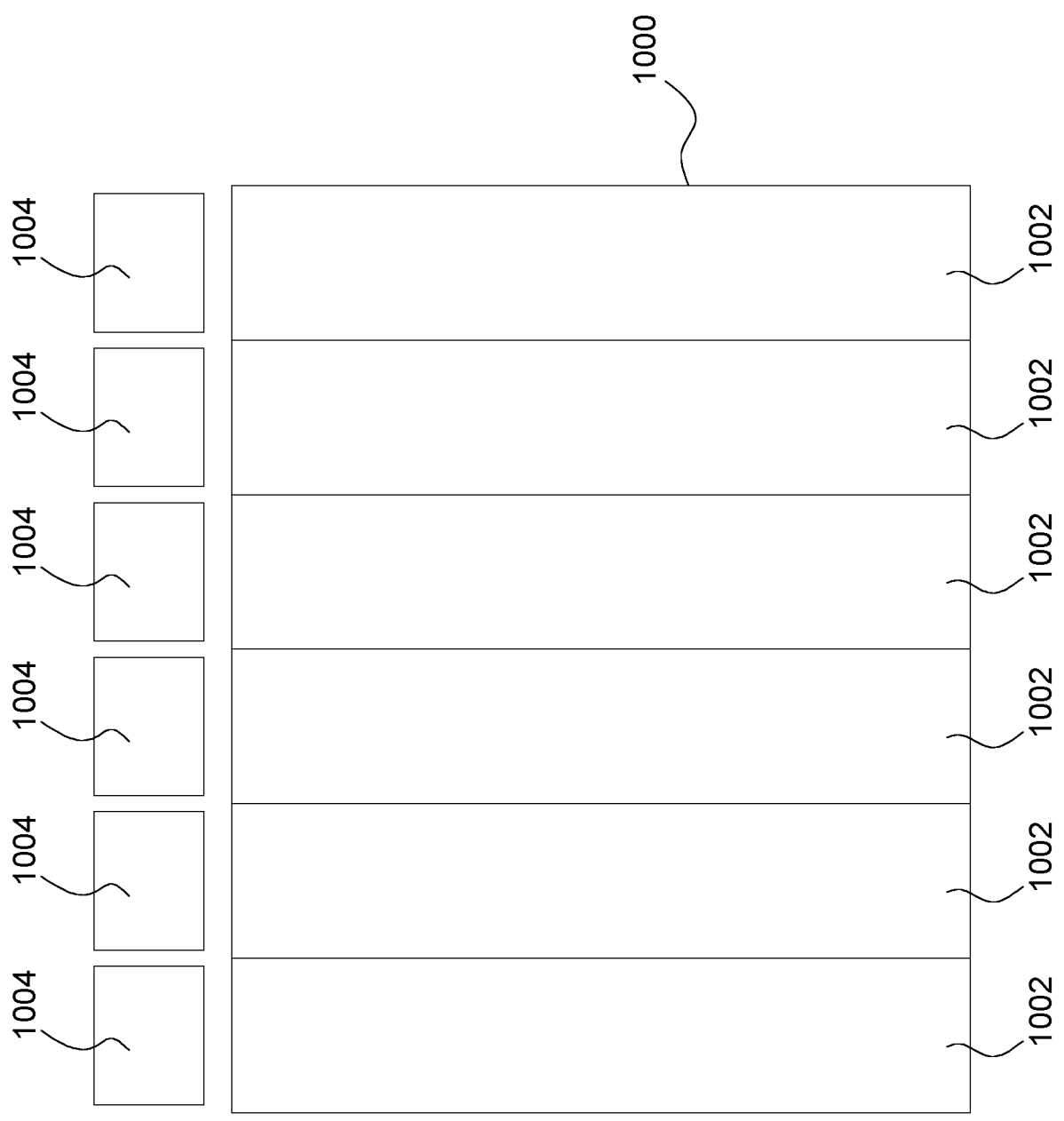
FIG. 10 is a schematic view of another example collection container that is partitioned into separate compartments, according to some implementations of the present disclosure.

FIG. 10 shows an example collection container 1000 that is internally partitioned into a plurality of compartments 1002. Each compartment 1002 is associated with a volumetric meter. For example, the collection container 1000 can be used to individually calibrate a plurality of volumetric meters, such as volumetric meters 304 described earlier. As each volumetric meter is operated, the sample of bulk material dispensed thereby is collected into one of the compartments 1002 associated with the volumetric meter being sampled. In some implementations, the compartments 1002 have movable or removable covers 1004. The covers 1004 may be closed after a desired number of samples of bulk material have been collected. The covers 1004 allow for isolating one compartment 1002 when, for example, returning the dispensed bulk material back a tank from which the bulk material was dispensed. The collection container 800 may include one or more onboard weight sensors, such as weight sensors 416. In other implementations, the collection container may exclude onboard weight sensors. In such instances, one or more weight sensors are provided on an air cart or other vehicle on which the meters being tested are provided.

Figure 11:
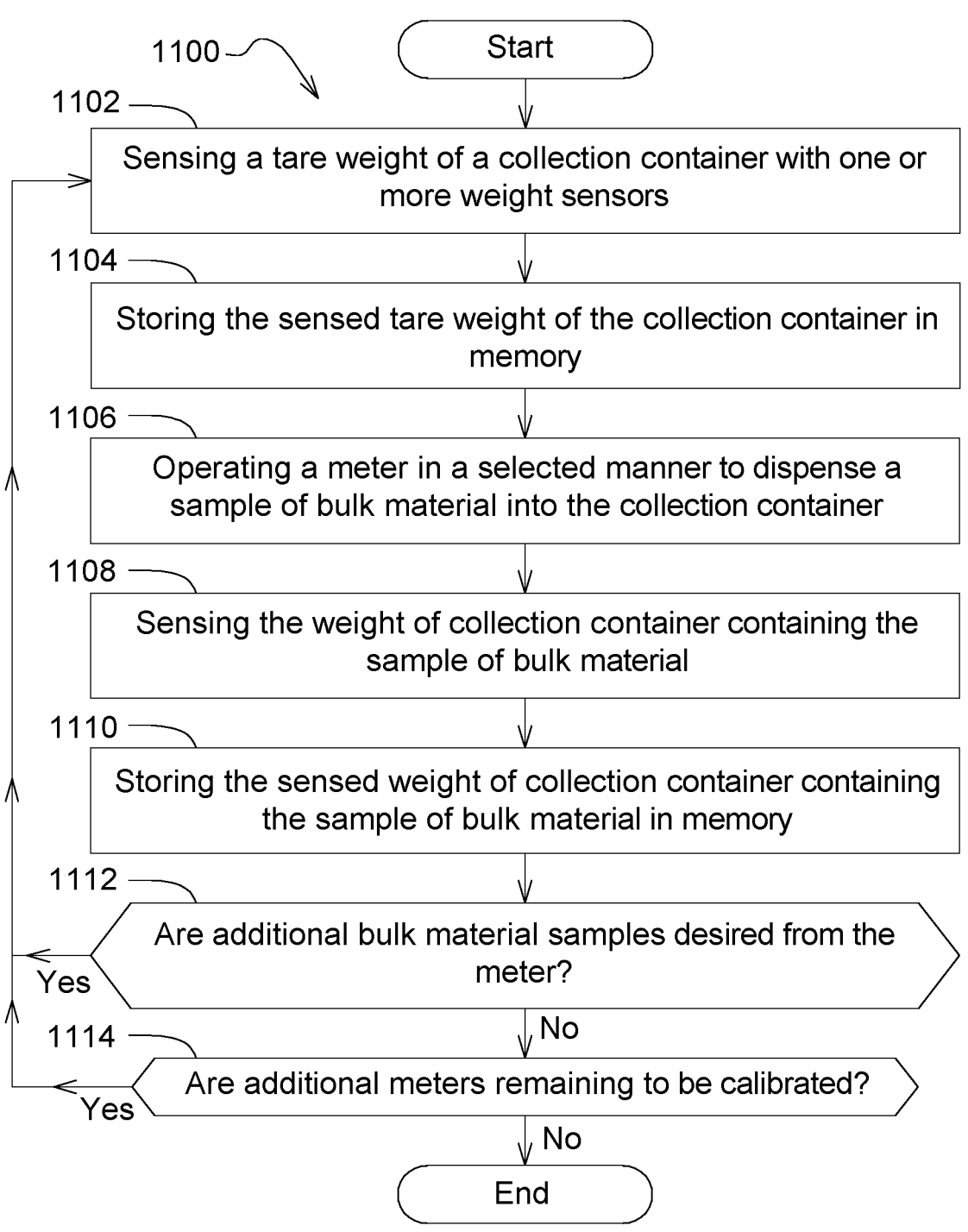
FIG. 11 is a flowchart of an example method of obtaining calibration information for calibrating one or more meters, according to some implementations of the present disclosure.

FIG. 11 is a flowchart of an example method 1100 for obtaining calibration information for calibrating one or more meters, such as one or more volumetric meters. At 1102, one or more weight sensors senses a tare weight of a collection container. The collection container may be similar to collection container 402 or 802. The tare weight of the collection container may reflect an empty condition of the collection container or a collection container containing an amount of material, such as bulk material. The tare weight of the collection container is stored in memory at 1104. At 1106, a meter is operated in a selected manner (such as for a selected number of cycles or a selected period of time at a selected operational speed) to dispense a sample of bulk material into the collection container. At 1108 a weight of the collection container containing the sample of bulk material is sensed with one or more weight sensors. At 1110, the sensed weigh of the collection container is stored in memory. As explained earlier, the tare weight of the collection container and the weight of the collection container containing a sample of bulk material can be used to determine the weight of the sample of bulk material alone. With the weight of the sample of bulk material and the selected manner of operation of the meter used to dispense the sample of bulk material, a calibration factor (e.g., an MDV) for the meter is determinable.

At 1112, a determination is made as to whether additional samples of bulk material from the meter are desired. In some instances, multiple samples of bulk material are obtained from a meter in order to provide a more precise calibration of the meter. If additional samples are desired, the method 1100 returns to 1102 and another sample of bulk material is obtained, and the associated weight thereof is determined. If no additional samples are desired from the meter, the method moves to 1114 where a determination is made as to whether additional meters are desired to be calibrated. If testing of additional meters is desired, the method 1100 moves to 1102, and one or more samples of bulk mater from the additional meter are obtained. If no additional meters are desired for testing, the method 1100 ends. In this way, a plurality of meters can be calibrated by obtaining a selected number of samples of bulk material from each meter.

The method 1100 may include fewer or additional elements. For example, in some instances, for each operation of the meter, the method includes storing in memory a number of cycles of operation of the meter or a time period of operation of the meter. Further, the memory may also be used to store a rate at which the meter is operated. In some instances, method 1100 includes determining a meter displacement value for a meter utilizing the sensed weights and the selected manner of operation (e.g., number of cycles of operation or the time period of operation). In some instances, the method 1100 includes calibrating a meter using a calibration factor (e.g., an MDV). In some implementations, the method 1100 includes sensing the weight of the collection container using weight sensors that are part of the collection container. In other implementations, the method 1100 includes sensing the weight of the collection container using weight sensors that are offboard of the collection container.

As described above, method 1100 provides for the generation of multiple calibration factors for a first meter, then multiple calibration factors for a second meter, and so on in sequence until calibration factors are generated for each meter. The operations performed to obtain each calibration factor may be considered a calibration routine. However, this sequence may vary without departing from the scope of the present disclosure. For example, a computer system, such electronic controller 449 or computer system 452 or 820, may perform a calibration routine for a first meter, then perform a calibration routine for a second meter, and so on until a single calibration routine has been performed for each of meter. Subsequently, the controller may perform a second round of individual calibration routines for the meters, and then a third round of calibration routines for the meters, and so on until a selected number of calibration factors for each meter is obtained.

At the conclusion of operating the one or more meters of an air cart or other agricultural vehicle or machine for calibration purposes, the collection container, such as collection containers 402 and 802, are removed such as by laterally sliding the collection container from slots, such as slots 404 and 816 that receives a flange of the collection container, such as flanges 410 and 818. A cover is secured to an opening through which the bulk material passed during operation of the one or more meters, placing the air cart or other agricultural vehicle in a condition to perform an agricultural operation.

In some instances, during meter calibration, a computer system, such as electronic controller 449 or computer system 452 or 820, may be configured to pause dispensing of the bulk material. Pausing of the meter may be an automatic operation, or pausing the meter may be in response to a user input. When operation of a meter is paused, the collection container, such as collection container 402, is emptied. For example, in some instances, a user detaches the collection container and empties the collected bulk material into a tank, such as tank 110, from which the bulk material was dispensed. The collection container is reattached, and meter calibration is continued. In some implementations, the computer system automatically continues meter calibration upon detecting reattachment of the collection container. For example, a sensor may detect reattachment of the collection container and provide a signal to the computer system indicating that meter calibration can continue. In some implementations, meter calibration restarts in response to a user input. Upon restarting meter calibration, the computer system senses the weight of the collection container and tare the sensed weight prior to operating a meter to dispense additional bulk material. As a result, the empty weight of the reinstalled collection container is taken into account so that an amount of bulk material subsequently dispensed can be accurately determined. The computer system automatically continues the meter calibration.

Figure 12:
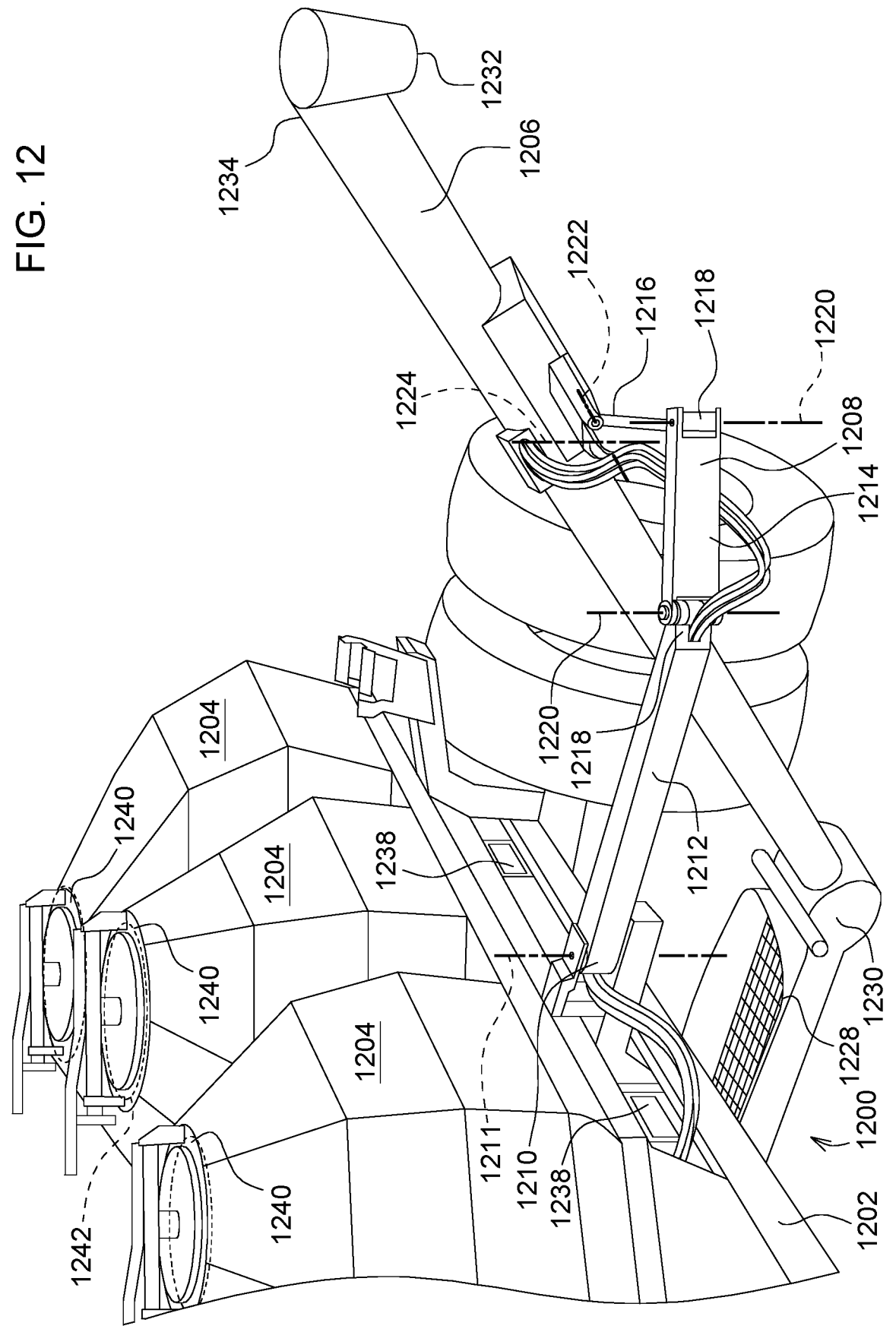
FIG. 12 is an oblique view showing another meter calibration system, according to some implementations of the present disclosure.
Figure 13:
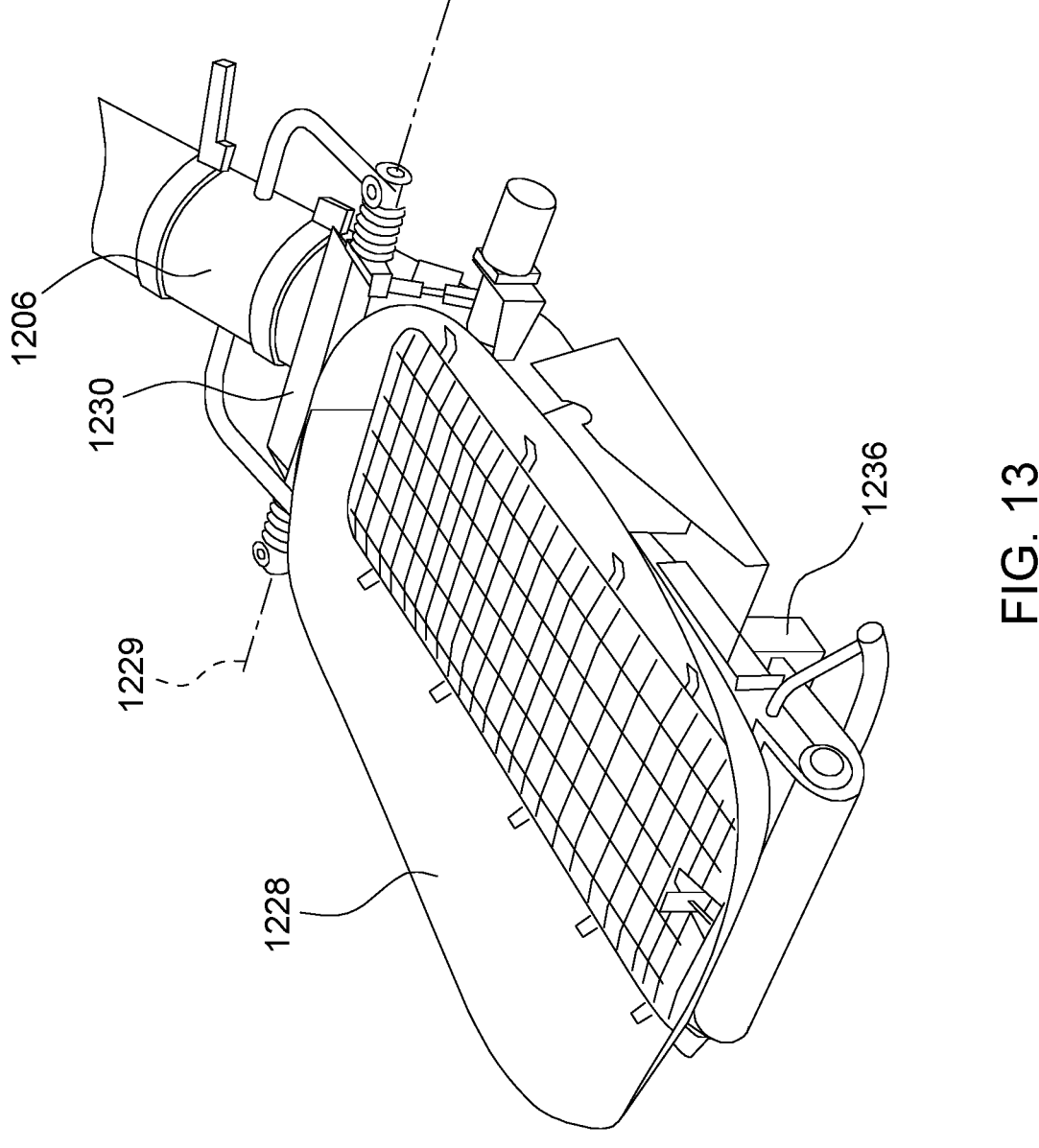
FIG. 13 is an example receptacle located at an end of a conveyor of the meter calibration system of FIG. 12.
Figure 14:
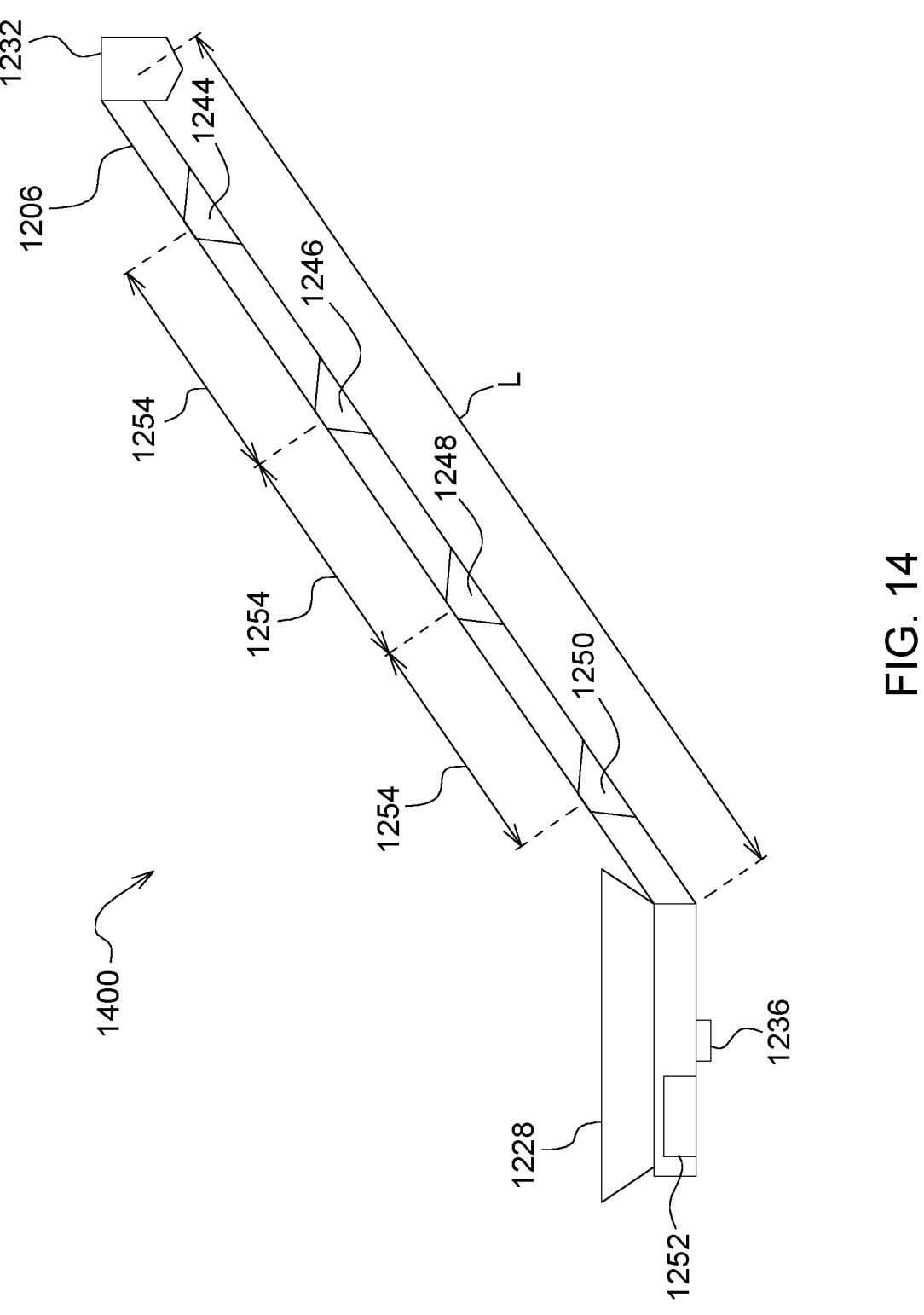
FIG. 14 is a schematic view of an example conveyor that has a plurality of different bulk material samples located at different positions along a length thereof, according to some implementations of the present disclosure.

FIGS. 12 through 14 illustrate another example system for calibrating meters, such as volumetric meters. The illustrated example is in the form of an air cart. However, as explained earlier, other types of vehicles (particularly, agricultural vehicles) or machines are included within the scope of the present disclosure. FIG. 12 shows an example air cart 1200 that includes a frame 1202, tanks 1204 coupled to the frame 1202, and a conveyor 1206 coupled to a frame 1202. The conveyor 1206 encompasses conveyors having flighted belts, screw conveyors, air conveyors, or any other conveyor operable to convey bulk materials. The conveyor 1206 is movable on an arm 1208 that is pivotably coupled to the frame 1202 at a first hinge 1210 that defines a vertical axis 1211. In the illustrated example, the arm 1208 includes a first portion 1212, a second portion 1214, and a third portion 1216. A hinge 1218 is disposed between adjacent portions, and each hinge 1218 defines a vertical axis 1220. The conveyor 1206 is pivotably connected to the third portion 1216. The conveyor 1206 is pivotable about a horizontal axis 1222 and a vertical axis 1224 at an end 1226 of the third portion 1216. In other implementations, the arm 1208 may include additional or fewer portions. Further, in some implementations, the conveyor 1206 is separate from the air cart 1200.

The conveyor 1206 includes a receptacle 1228 at a first end 1230. In some implementations, the receptacle 1228 is in the form of a hopper. As shown in FIG. 13, the receptacle 1228 is pivotable on the first end 1230 about a horizontal axis 1229. The receptacle 1228 receives bulk material, such as seed or fertilizer, and conveys the received bulk material along a length thereof to a spout 1232 located at a second end 1234 of the conveyor 1206. A weight sensor 1236 is coupled to the receptacle 1228, as shown in FIG. 13, to sense a weight of the bulk material received thereinto.

Returning to FIG. 12, the air cart 1200 includes a plurality of meters 1236. In some implementations, one or more meters 1238 is provided for each tank 1204. The tanks 1204 feed bulk material therefrom to the associated meter or meters 1238.

In operation, access is obtained to the bulk material discharged by the meters 1236. In some instances, obtaining access involves removing or opening a door or hatch to expose an opening. The conveyor 1206 is positioned such that the receptacle 1228 is located adjacent to the opening so that dispensed bulk material passes through the opening and into the receptacle 1228. The meter 1236 is operated to dispense a sample of bulk material. For example, the meter 1238 is operated in a selected manner (e.g., a selected number of cycles) to produce the sample of bulk material.

The dispensed bulk material is weighed by one or more weight sensors 1236 coupled to the receptacle 1228. The weight sensors 1236 may be similar to weight sensors 416 and 808. Thus, in some implementations, the weight sensors 1236 are load cells. In the example described, a single weight sensor 1236 is reference, although it will be understood that multiple weight sensors are intended to be encompassed. A tare weight of the receptacle 1228 may be sensed and used to determine a weight of the dispensed bulk material exclusively. The weight sensed by the weight sensor 1236, e.g., any applicable portion of the receptacle 1228 and any object therein (e.g., bulk material), is sensed as a new tare weight, and the meter 1238 is operated again to dispense another sample of bulk material. This process can be repeated a number of times. A limit on the number of samples collected may be a volumetric capacity of the receptacle 1228.

The dispensed bulk material may be returned to the tank 1204 from which the bulk material was provided, another tank 1204, or some other location. For example, a cover 1240 of the tank 1204 is removed or repositioned to expose an opening 1242, and the conveyor 1206 is repositioned, such as by manipulation of the arm 1208, so that the spout 1232 is positioned above the opening 1242. The conveyor 1206 is operated to convey the bulk material in the receptacle 1228 to the spout 1232 and expelled from the spout 1232 into the tank 1204.

In other implementations, the conveyor 1206 is operated so that a plurality of samples of bulk material are resident therein. As a result, a plurality of samples from the same or different meters 1226 can be measured without having to reposition the conveyor 1206 for disposal of the sample after each bulk material sample is dispensed. FIG. 14 shows a schematic view of example conveyor system 1400 that includes the conveyor 1206, receptacle 1228, and a computer system 1252. The conveyor 1206 contains a plurality of different bulk material samples 1244. As show, the samples 1244 through 1250 are located at different positions along a length of the conveyor 1206, with the sample 1244 being the earliest dispensed. The computer system 1252 may be similar to the computer systems 452 and 822 or electronic controller 449 and provide similar functionality. As such, details of the computer system 1252 are omitted In operation, with the receptacle 1228 positioned to receive dispensed samples of bulk material from one or more of the meters 1238 of the air cart 1200, one of the meters 1238 is operated in a selected manner (e.g., a selected number of cycles at a selected operational speed), and the dispensed bulk material is received into the receptacle 1228. In some instances, the computer system 1252 is operable to sense a tare weight of the receptacle 1228 prior to receipt of the bulk material samples and store the tare weight in memory. With the sample of bulk material dispensed, the weight sensor 1236 again senses the weight of the receptacle 1228, and the computer system 1252 stores the sensed weight in memory. In some implementations, the computer system 1252 uses the stored weights to determine the weight of the bulk material sample 1244 alone. In some implementations, the computer system 1252 stores details regarding the selected manner of operation (e.g., the number of cycles operated by the meters 1238 to dispense the bulk material sample 1244), and the computer system 1252 is operable to use the sample weight and the details of the selected manner of operation to determine an MDV for the meter 1238.

After the weight of the bulk material sample 1244 has been weighed by the weight sensor 1236, the conveyor 1206 is operated for a selected period of time or number of cycles in order to transport the bulk material sample 1244 to a selected position along the length L of the conveyor 1206. Another sample from the same meter 1238 may be desired. Therefore, with the first bulk material sample 1244 relocated to position along the conveyor 1206, another bulk material sample 1246 is dispensed from the same volumetric meter 1238. Again, the weight of the bulk material sample 1246 is obtained using a tare weight and a subsequent weight measurement taken using the weight sensor 1236. The second bulk material sample 1246 is then advanced, along with the first bulk material sample 1244 along the length L of the conveyor 1206. In this way, a separation gap 1254 is formed between adjacent bulk material samples along the length L of the conveyor 1206. In some instances, the separation gap 1254 is uniform. In other implementations, the separation gap 1254 is alterable such different separation gaps 1254 can be formed between different bulk material samples. As such, multiple samples from the same meter 1236 or different meters 1236 can be dispensed, e.g., serially, and contained within the conveyor 1206 continually. Consequently, disposal of a prior bulk material sample is not needed before a subsequent bulk material sample is dispensed.

If one or more samples from a different meter 1238 is desired, the conveyor may be repositioned to a location adjacent to the new meter, and, with an opening formed to permit egress of the bulk material sample dispensed by the volumetric meter 1238 into the receptacle 1228 (such as by opening a hatch), the meter 1238 is operated in a selected manner to dispense a third bulk material sample from a different tank 1204. The weight of the bulk material sample 1248 is obtained in a manner similar to that already described, and the conveyor 1206 is advanced to move bulk material samples 1244, 1246, and 1248 along the length L of the conveyor 1206. In some implementations, repositioning of the conveyor 1206 prior to obtaining a sample from a different volumetric meter 1238 is avoided, because the conveyor 1206 may have a position that enables the receptacle 1228 to receive bulk material samples from a plurality of different meters 1238.

Computer system 1252 may communicate with a computer system of air cart that controls and calibrates meters. In other instances, the computer system 1252 controls operation and calibration of meters. Although computer system 1252 is shown coupled to conveyor, the computer system 1252 may be remote from conveyor 1206 and provided elsewhere on the air cart 1200 or remotely from air cart 1200. In some implementations, the weight sensor 1236 may communicate wirelessly with computer system 1252.

Figure 15:
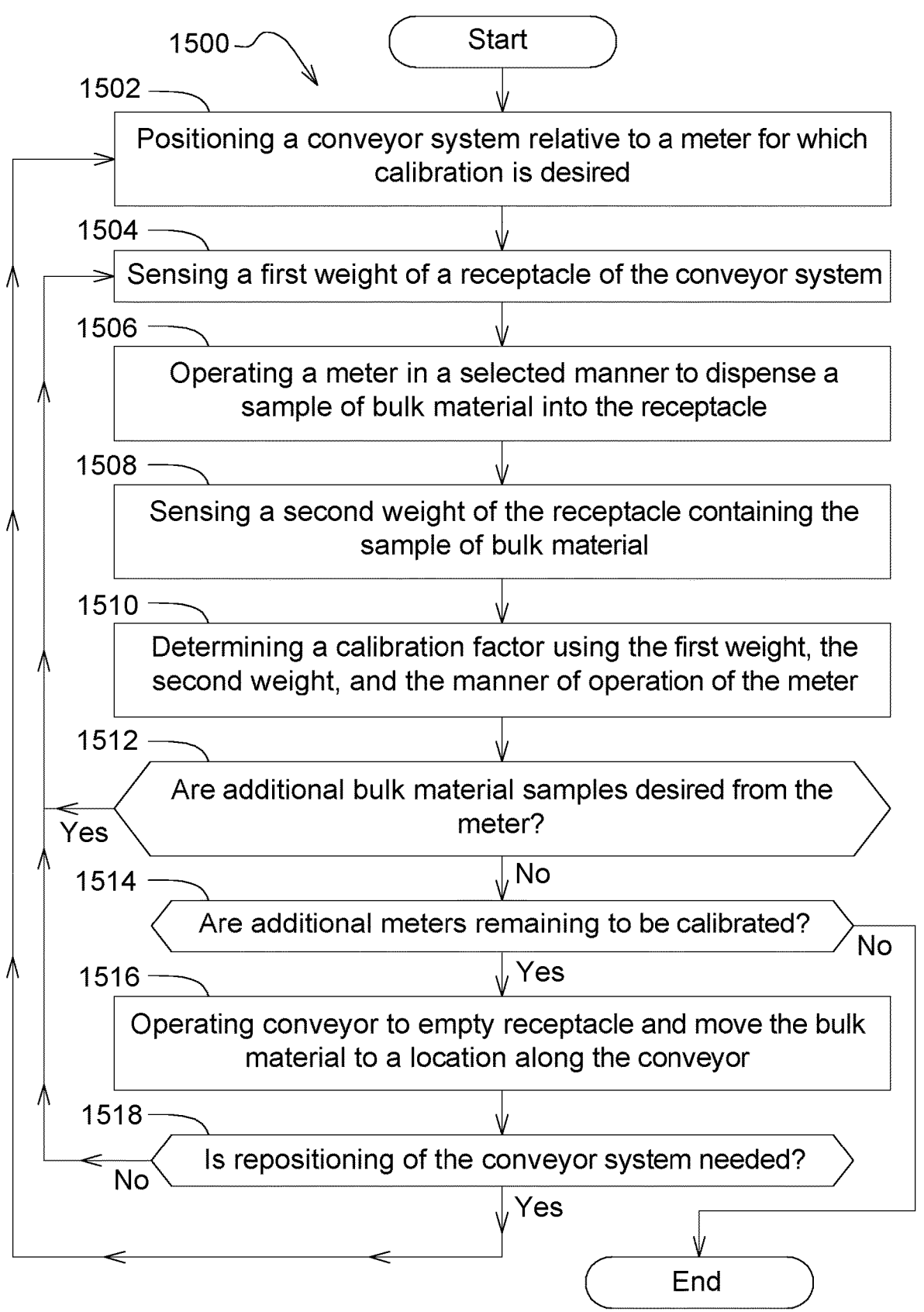
FIG. 15 is a flowchart of an example method for calibrating a meter using a conveyor system, according to some implementations of the present disclosure.

FIG. 15 is a flowchart of an example method 1500 for calibrating one or more meters using a conveyor system, which may be similar to conveyor system 1400. At 1502, the conveyor system is positioned relative to a meter for which calibration is desired such that the receptacle of a conveyor of the conveyor system is positioned so that bulk material dispensed from the meter is collected in the receptacle. For example, the receptacle is placed under the meter to collect the dispensed bulk material. In some implementations, the conveyor system is positioned to a desired location automatically by a computer system, such as computer systems 452, 820, or 1252 or electronic controller 449. In other implementations, the conveyor system is manually positioned by a user. At 1504, a weight sensor takes a first weight measurement of the receptacle. In some implementations, a plurality of weight sensors are used. In some instances, the first weight measurement is a tare weight so that the weight of a sample of dispensed bulk material can be determined.

At 1506, the meter is operated such that a sample of bulk material is dispensed. As explained earlier, the meter may be operated in a selected manner (e.g., for a selected number of cycles or a selected period of time) to dispense a sample of bulk material into the receptacle. At 1508, the weight sensor makes a second weight measurement of the receptacle containing the sample of bulk material. The weight of the sample of bulk material is determined by subtracting the first weight measurement from the second weight measurement. In some instances, a computer system (such as computer systems 452, 820, or 1252 or electronic controller 449) automatically determines the weight of the sample material in this fashion. At 1510, a calibration factor is determined using the selected manner of operation of the meter (e.g., the selected number of cycles operated by the meter to dispense the sample of bulk material) and the determined weight of the sample of bulk material. For example, the computer system utilizes this information to produce an MDV.

At 1512, a determination is made as to whether additional bulk material samples from the same meter is desired. If so, in some implementations, the method 1500 returns to 1504, and the method 1500 continues from there as described above. In other implementation, the conveyor is operated to move the sample of bulk material from the receptacle and to a location along a length of the conveyor. Thus, in some instances, each sample of bulk material from a meter is deposited into an empty receptable. In other implementations, additional samples are added to the receptable without first emptying the receptacle. In such instances, multiple samples may be dispensed into the receptable until a selected number of samples are deposited or until a weight of the receptable, as detected by the weight sensor, is reached. Once a weight of the receptable has reached a selected weight, the conveyor is operated to empty the receptacle and move the bulk material to a location along the conveyor. The latter approach may be used when dispensing multiple samples from the same tank via a meter. The former approach may be used when dispensing multiple samples from different tanks. This avoids commingling different bulk materials so that the different bulk materials can be returned to respective tanks in an uncontaminated condition. If no additional samples from the meter are desired, the method moves to 1514.

At 1514, a determination is made as to whether calibration of additional meters is desired. If so, the method 1500 moves to 1516 where the conveyor is operated to empty the receptacle and move the bulk material from the receptacle to a location along the conveyor. At 1518, a determination is made as to whether repositioning of the conveyor is needed so that material dispensed from the meter is received into the receptacle. In some implementations, relocating the receptacle is unnecessary as the meters may be arranged and the receptacle may be sized and shaped such that the receptacle is positioned to receive bulk material dispensed from another meter. If repositioning of the receptacle is needed, the method then returns to 1502, and the method continues from there. If repositioning of the receptacle is not needed, then the method returns to 1504, and the method 1500 continues from there.

One or more of the operations of the method 1500 may be performed automatically, for example, by a computer system, such as computer systems 452, 820, and 1252 or electronic controller 449. Thus, in some instances, the method 1500 is an automated process performed by a computer system. In other implementations, one or more of the operations of method 1500 are performed manually.

Thus, in some implementations, some operations are automated, and some are manually performed.

Figure 16:
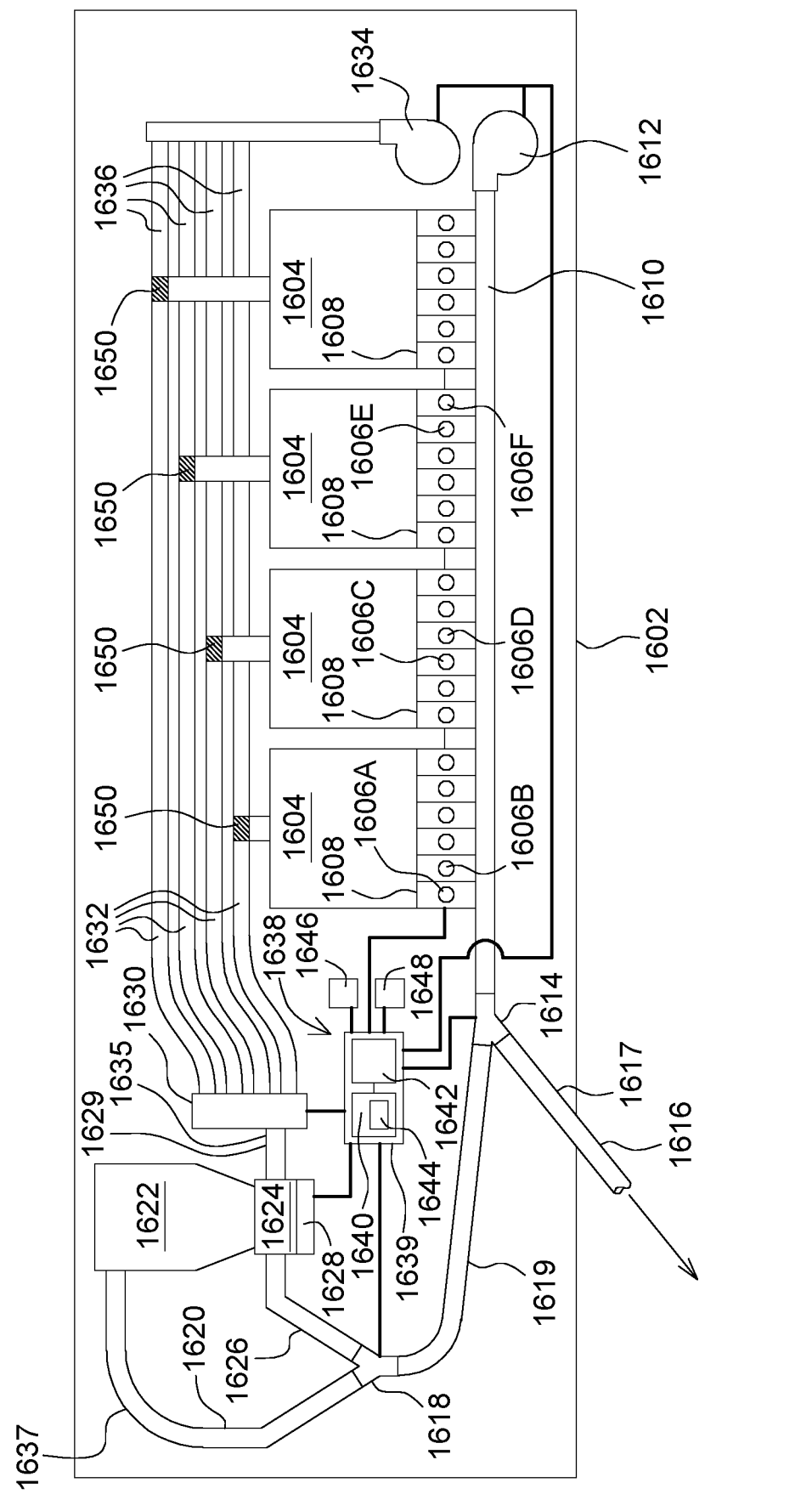
FIG. 16 a schematic view of another example meter calibration system, according to some implementations of the present disclosure.

FIG. 16 is a schematic view of another example meter calibration system 1600 for calibrating bulk materials and, particularly, bulk agricultural materials. The calibration system 1600 includes a work vehicle 1602, such as a seeding implement (e.g., an air seeder), having a plurality of tanks 1604 for storing a bulk material, such as seed, fertilizer, or another commodity. A plurality of meters 1606 are also provided and are arranged to dispense bulk material from a respective tank 1604. In some implementations, the meters 1606 are volumetric meters. As shown, each tank 1604 has a plurality of associated meters 1606. More particularly, each tank 1604 has six meters associated therewith and are operable to dispense bulk material from the respective tank 1604. In other implementations, additional or fewer meters 1606 are associated with each tank 1604. Further, in some implementations, a single meter 1606 is associated with each tank 1604. Although various aspects of the calibration system 1600 are described as being part of the work vehicle 1602, one or more of those aspects may be located remotely from the work vehicle 1602 and remain within the scope of the disclosure.

As shown, the meters 1606 are designated with a letter. Thus, each tank 1604 has a group 1608 of meters 1606A through 1606F associated therewith. Similarly situated meters, e.g., all meters 1606A, all meters 1606B, etc., form a meter set. A conduit 1610 (e.g., a tube, pipe, or other structure to convey a fluid) extends between and is interconnected all of the meters within a meter set, such as the meters 1606A. In other instances, the conduit 1610 may extend between and interconnect all of the meters of a different meter set, e.g., all meters 1606B, 1606C, 1606D, 1606E, or 1606F. Still further, in some implementations, the work vehicle 1602 includes a plurality of conduits 1610, each interconnecting all of the meters 1606 within a meter set. In some implementations, the work vehicle 1602 includes a conduit 1610 for each meter set. Where a single conduit 1608 is present, each meter 1606 of a meter set interconnected by the conduit 1606 is used as a proxy to represent all of the meters 1606 of a respective group 1608.

The conduit 1610 extends from a first air source 1612, such as a fan or other apparatus or system to generate a fluid flow, e.g., a flow of air or other gas, to a first valve 1614. The first valve 1614 is selectable to direct the fluid flow, via a conduit 1616, to a seeding tool, for example, for introducing the bulk material to the ground, or to a second valve 1618 via a conduit 1619. The conduit 1610 and the conduit 1616 form part of a first passage 1617 that transports bulk material to a distribution location. The second valve 1618 is selectable to direct the fluid flow, via a conduit 1620, to a separator 1622 that separates bulk material from the fluid flow or to a compartment 1624, via conduit 1626, coupled to the separator 1622. The compartment 1624 collects the bulk material separated from the fluid flow by the separator 1622. A weight sensor 1628 is coupled to the compartment 1624 and weighs the bulk material deposited into the compartment 1624. A conduit 1629 extends to a third valve 1630 that is selectable to direct the fluid flow back to the tanks 1604. In the illustrated example, a plurality of conduits 1632 extend from the third valve 1630 with each conduit 1632 extending to one of the tanks 1304. Thus, the third valve 1630 is selectable to direct the fluid flow from the conduit 1632 to one or more of the tanks 1604.

The conduits 1610, 1619, 1626, and 1629 and conduits 1632 form a second passage 1635 that is used to transport bulk material from the compartment 1624 to the tanks 1604.

The conduits 1610, 1619, and 1620 form a third passage 1637 that is used to transport bulk material from the meters 1606 to the separator 1622 and, ultimately, the compartment 1624.

The work vehicle 1602 also includes a second air source 1634. The second air source 1364 is in fluid communication with each tank 1604 via conduits 1636 and provides a fluid flow, such as a flow of air, to pressurize the tanks 1604. Conduits 1636 form pressurization passages used to pressurize the tanks 1604. In some implementations, the second air source 1634 is omitted, and the first air source 1612 is used to transport dispensed bulk material away from the meters 1606 as well as pressurize the tanks 1604 via conduits 1636. The conduits 1610, 1616, 1619, 1620, 1626, 1629, 1632, and 1636 and valves 1614, 1618, 1630 and 1650 form a pneumatic distribution system that is used to transport dispensed bulk material. In some instances, the air source 1612, air source 1634, or both also form part of the pneumatic distribution system.

The calibration system 1600 also includes an electronic control system 1638. In some implementations, the control system 1638 is a computer system similar to computer system 2100, described in more detail below. The control system 1638 includes an electronic controller 1639 that includes at least one processor 1640 and a least one memory 1642 communicably coupled to the processor. Software 1644, such as in the form of an application or program, is executed by the processor 1640, for example, to control operation of the various components of the calibration system 1600. For example, the control system 1638 is operable to send and receive signals such as to control operation of one or more of the valves 1614, 1618, and 1630, control operation of one or more of the air sources 1612 and 1634, control operation of one more of the meters 1606, and to receive output from the weight sensor 1628 corresponding to a weight of bulk material separated by the separator 1622. The control system 1638 also includes an input device 1646 to receive user inputs and a display 1648 that is operable to output information to a user. In some implementations, the display 1648 is a touch screen through which a user input can be provided, such as via a graphical user interface (GUI). Thus, in some implementations, the input device 1646 may omitted.

Figure 17:
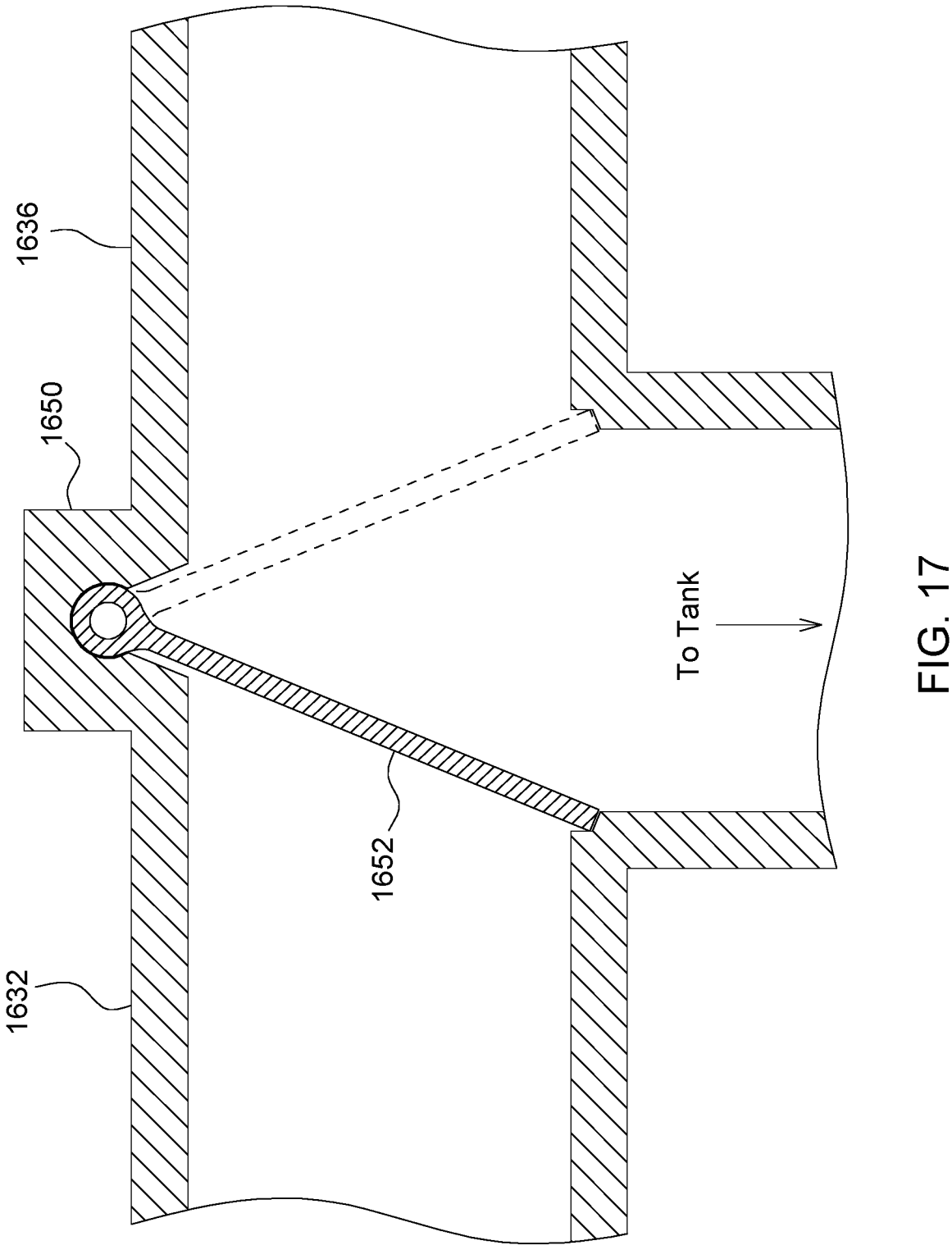
FIG. 17 is a schematic view of an example valve, according to some implementations of the present disclosure.

One of the conduits 1632 and one of the conduits 1636 meet each tank 1604 at a valve 1650. In some implementations, the valves 1650 are biased flapper valves, as shown in more detail in FIG. 17. As shown in FIG. 17, the valve 1650 includes a flapper 1652 that is biased into a first position (shown) in which the conduit 1632 is in a closed condition. With the valve 1650 in the first position, fluid flow from air source 1634 or 1612 is directed into the tank 1604 to pressurize the tank 1604. The flapper 1652 is movable to a second position, shown in dotted line when a pressure in conduit 1632 exceeds a selected value, such as when an air flow is present to return bulk material to the tank 1604. In the second position, the valve 1650 closes the conduit 1636 and allows fluid flow from the conduit 1632 to the tank 1604, providing for return of the bulk material to the tank 1604 from the compartment 1624.

Although pressure actuated valves 1650 are described, other types of valves may also be used. For example, in some implementations, electrically operated valves are used and communicably coupled to the control system 1638. For example, the valves 1650 may be controlled with an electric motor or other electrical device. In other implementations, the valves 1650 may be actuated in other ways, such as hydraulically or pneumatically. In such instances, the control system 1638 controls operation of the valves 1650 to facilitate return of bulk material to a tank 1604.

Figure 18:
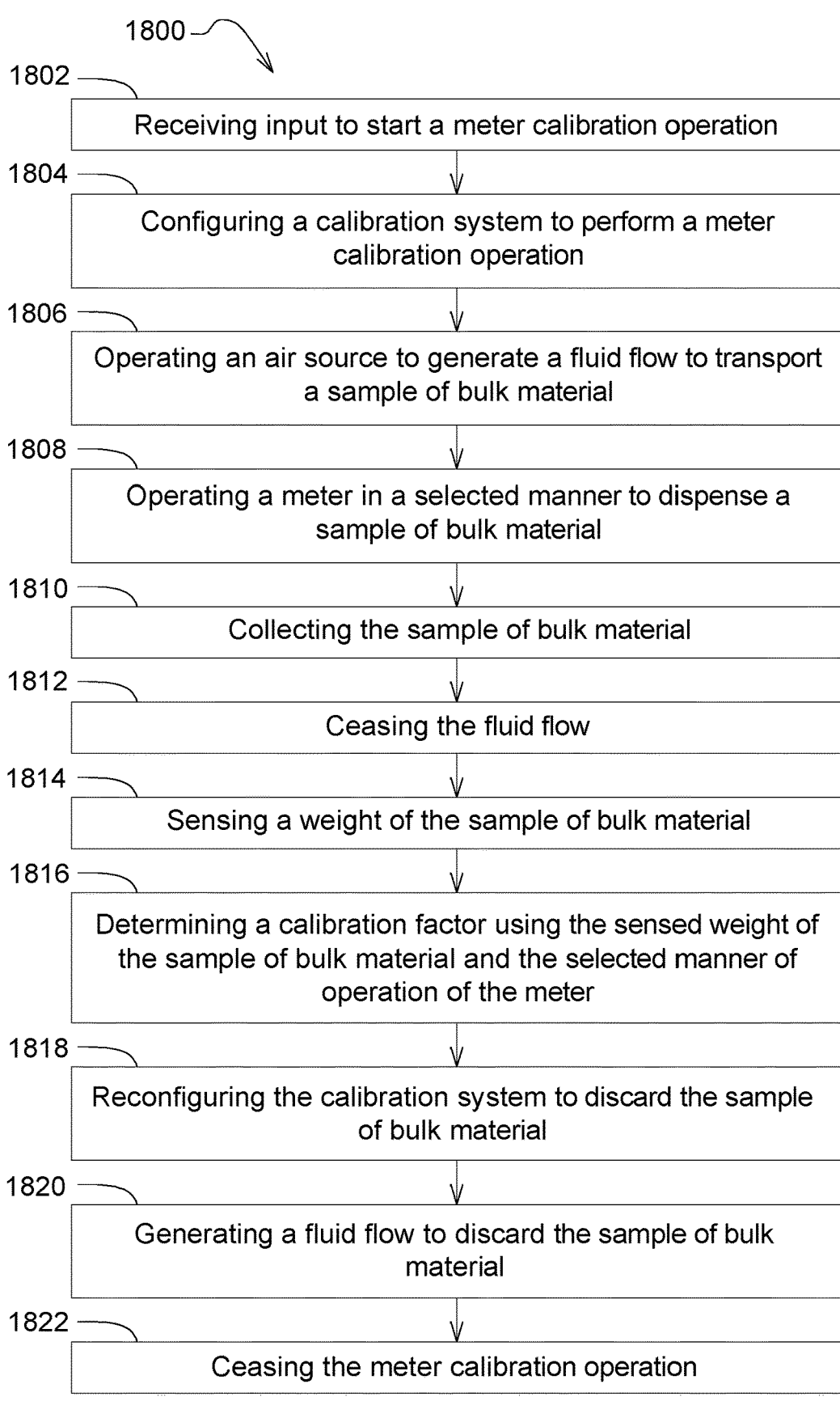
FIG. 18 is a flow chart of another example method for calibrating a meter, according to some implementations of the present disclosure.

An example operation of the calibration system 1600 is described in the context of FIG. 18. FIG. 18 is a flow chart of an example method 1800 for calibrating a meter, such as a volumetric meter. At 1802, an input is received that a calibration for a meter is desired. In some implementations, a user interacts with the input device 1646 or display 1648 (where the display 1648 is a touch screen display) of the control system 1638 to start a calibration of the calibration system 1600. In other implementations, initiation of a calibration process is automatically performed, such as by the control system 1638. At 1804, the calibration system 1600 is configured to perform a meter calibration. For example, the control system 1638 controls the first valve 1614 and the second valve 1618 to form a path from the air source 1612 to the separator 1622. For example, the control system 1638 controls the first and second valves 1614 and 1618 to provide fluid communication between the conduits 1610, 1619 and 1620 and prevent fluid flow through the conduit 1616 and conduit 1626. At 1806, the air source 1612 is operated. For example, the control system 1638 signals the air source 1612 to begin operation, such as at a selected speed to generate a desired fluid flow. At 1808, one of the meters 1606, for which calibration is desired, is operated to dispense a sample of bulk material. For example, the control system 1638 operates the meter 1606 in a selected manner, such as for a selected number of cycles at a selected speed of operation or for a selected period of time. The meter 1606 dispenses a sample of bulk material from the tank 1604 associated with the meter 1606 into the fluid flow generated by the air source 1612. At 1810, the sample of bulk material is collected. The fluid flow transports the sample of bulk material to the separator 1622, wherein the bulk material is removed from the fluid flow, causing the bulk material to settle in the compartment 1624. At 1812, the fluid flow is ceased. In some implementations, the fluid flow is stopped after a selected period of time. The selected period of time may be a period of time to ensure that the entire sample of bulk material is transported to and separated by the separator 1622. At 1814, a weight of the sample of bulk material is sensed. For example, the weight of the sample of bulk material is sensed by the weight sensor 1628. The control system 1638 receives an output from the weight sensor 1628 representing the weight of the sample of bulk material. In some implementations, a first weight is sensed by the weight sensor 1628 before the bulk material is collected in the compartment 1624. A second weight is sensed after collection of the bulk material in the compartment 1624 to allow the control system 1638 to determine the weight of the sample of bulk material transported to the compartment. At 1816, a calibration factor is determined. For example, the control system 1638 utilizes the selected manner of operation of the meter 1606 and the weight of the sample of bulk material to determine a calibration factor, such as an MDV. The calibration factor is used to operate the meter 1606 to provide a controlled amount of output. At 1818, the calibration system is reconfigured to discard the sample of bulk material. For example, the control system 1638 causes the valve 1618 to direct the fluid flow from conduit 1620 to conduit 1626 to pass through the compartment 1624. The control system 1638 also causes the third valve 1630 to open a conduit 1632 corresponding to the tank 1604 from which the bulk material was dispensed or to a tank 1604 to where the sample of bulk material is to be sent. At 1820, a fluid flow is generated to dispose of the sample of bulk material. For example, the control system 1638 operates the air source

1612 to generate a fluid flow. The fluid flow is directed to the compartment 1624 via the conduit 1610, the valve 1614, the conduit 1619, the valve 1618, and the conduit 1626. In some implementations, the fluid flow transports the sample of bulk material in the compartment 1624 through a conduit 1632 corresponding to the tank 1604 from which the sample of bulk material was obtained. Further, in some instances, the fluid flow causes the flapper 1652 to move to the second position, as described above in the context of FIG. 17, allowing the sample of bulk material to be transported back into the tank 1604. At 1822, the calibration process is ceased. For example, the control system 1638 operates the air source 1612 for a selected period of time to ensure that the entirety of the sample of bulk material is removed from the compartment 1624 and returned to the tank 1604. The control system 1638 ceases operation of the air source 1612 after the selected period of time has expired. In some instances, the flapper 1652 of the valve 1650 returns to the first position in the absence of the fluid flow. In some instances, the control system 1638 reconfigures the calibration system 1600 into a planting configuration, such as by repositioning the first valve 1614 to provide fluid communication between the conduit 1610 and conduit 1616.

Although an example method 1800 is shown and described, the method 1800 can be altered, such as by removal of one or more operations, addition of one or more operations, or modification of one or more operation, such as by altering an order of the operations. In some implementations the fluid flow is ceased after the calibration factor is determined. For example, the calibration operation may be preceded a priming operation to prime the meter 1606. Priming may involve operating the meter 1606 for a selected period of time or a selected number of cycles with or without operation of the air source 1612. In some implementations, the meter 1606 is operated to dispense the sample of bulk material prior to operation of the air source 1612 to generate the fluid flow. Other modifications are also contemplated.

At the conclusion of a calibration operation, such as the example calibration operation described in the context of FIG. 18, another calibration operation may be performed for the same meter or for a different meter. For example, a selected number of calibration operations may be performed for a meter, and then one or more calibration operations may be performed for another meter. Operation may continue in this manner for any number of meters for which calibration is desired.

Figure 19:
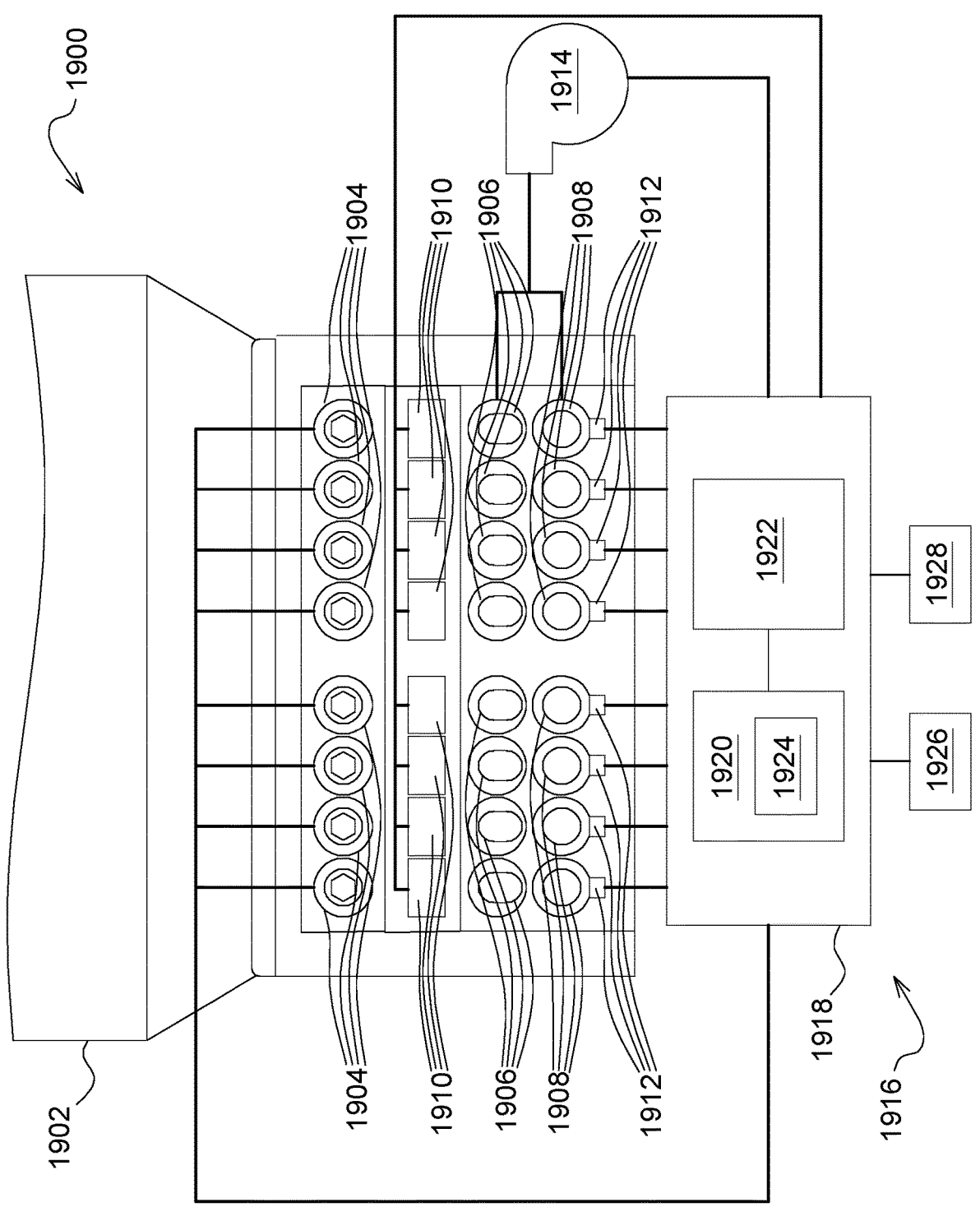
FIG. 19 is a schematic view of another example meter calibration system, according to some implementations of the present disclosure.

FIG. 19 is a schematic view of another example calibration system 1900 for calibrating bulk material such as agricultural bulk materials including seed or fertilizer. The calibration system 1900 includes a tank 1902 for storing a bulk material, such as seed, fertilizer, or another commodity. A plurality of meters 1904 is in communication with the tank 1902 and dispenses the bulk material therefrom. The meters 1904 may be volumetric meters. Each meter 1904 is associated with a first conduit 1906 and a second conduit 1908. A valve 1910, such as a slide gate valve or flapper valve, directs the dispensed bulk material to one of the first conduit 1906 or the second conduit 1908. Although eight meters 1904 are illustrated, the scope of the disclosure encompasses additional or fewer meters. For example, in some implementations, the calibration system 1900 includes a single meter 1904. Additionally, although both a first conduit 1906 and a second conduit 1908 are included, in other implementations, a single conduit is provided for each meter 1904. In such instances, the valves 1910 can be omitted.

Weight sensors 1912 are coupled to the conduits 1908 and sense a weight of bulk material deposited respectively thereinto. Although the example the calibration system 1900 includes a weight sensor 1912 coupled to each conduit 1908, in other implementations, fewer weight sensors 1912 may are included. That is, some conduits 1908 may omit weight sensors. For example, in some implementations, a single conduit 1908 is coupled to a weight sensor 1912 and the other conduits 1908 omit a weight sensor 1912. In such instances, performance of the meter 1904 associated with the conduit 1908 having a weight sensor 1912 can be used as a proxy for the meters 1904 that do not have an associated weight sensor 1912. Thus, a calibration factor obtained for the meter 1904 associated with a weight sensor 1912 can be used to represent the metering performance of one or more meters 1904 that do not have an associated weight sensor 1912.

In other instances, a bulk material dispensing arrangement may include a single meter. In some instances, the single meter is compartmentalized so that the meter is operable to dispense bulk material to multiple conduits as the meter operates. For example, one compartment of the meter corresponds to one conduit. In such instances, a weight sensor coupled to one conduit of a plurality of conduits serviced by the single meter senses a weight of the dispensed bulk material. The sensed weight is used to calibrate the meter. In other instances, a plurality of the conduits serviced by the compartmentalized meter includes or is coupled to a weight sensor to sense a weight of the bulk material dispensed respectively thereinto. Thus, for a single operation of the meter, a plurality of bulk material samples are produced along with a plurality of weight data for the dispensed bulk material samples. The weights of these bulk material samples can be used to calibrate the meter. The sensed weight data are used to calibrate the meter. For example, a selected manner of operation (e.g., a number of cycles of operation of the meter) can be used with the sensed weight data to determine an MDV for meter calibration.

With the weight of the sample of bulk material sensed by the weight sensor 1912, a fluid flow (such as an air flow or flow of another gas) is introduced into the respective conduit 1908 to transport the dispensed bulk material to another location. For example, a fluid flow of air may conduct the dispensed bulk material back to the tank 1902, which is the tank from which the bulk material was dispensed. In some instances, a fluid flow is generated by an air source 1914, such as fan, as shown in FIG. 1. The air source 1914 is in fluid communication with the conduits 1906 and 1908, and the generated fluid flow is passed through the conduits 1908 to entrain the dispensed sample of bulk material. In some implementations, multiple air sources may be used. In some instances, an air source may be provided for a single conduit or for a plurality of conduits.

In some implementations, the example calibration system 1900 is included on a work vehicle, such as a seeding implement (e.g., an air seeder). In some instances, a plurality of calibration systems 1900 are included on a work vehicle, and the calibration systems 1900 may be arranged in a manner similar to that shown in FIG. 16. In such instances, each tank 1902 may contain the same or different bulk materials. Returning a sample of bulk material to a tank, such as the tank from which the bulk material was dispensed, may include a conduit arrangement similar to the arrangement shown in FIG. 16, particularly with respect to conduits 1632. For example, a valve similar to valve 1630 can be used to select a tank to which the bulk material is to be returned, and a fluid flow can be generated, such as with an air source similar to air source 1914 or 1612. In this way, a sample of bulk material dispensed to calibrate the meter

1904 can be returned to the tank 1902. In other instances, the sample of bulk material can be transported to another location other than the tank 1902.

The calibration system 1900 also includes a control system 1916. In some implementations, the control system 1916 is a computer system similar to computer system 2100. The control system 1916 includes a controller 1918 that includes a processor 1920 and a memory 1922 communicably coupled to the processor 1920. Software 1924 is executed by the processor to provide logic to the controller 1918 to control operation of the calibration system 1900. Similar to the other computer systems described herein, the controller 1918 operates based on the logic and instructions contained in the software 1924. The control system 1916 also includes an input device 1926 and a display 1928. The features of the control system 1916 may be similar to the counterpart features of the various control system or computer systems already described herein, such as control system 1638. As such, further description of these features of the control system 1916 is omitted.

The controller 1918 is communicably coupled to the meters 1904, the valves 1910, and the weight sensors 1912. Although FIG. 19 shows the controller 1918 communicably coupled to all of the meters 1904, valves 1910, and weight sensors 1912, in other implementations, the controller 1918 is communicably coupled to fewer than all of these components, such as in instances where some of the meters 1904 do not have an associated weight sensor 1912. The controller 1918 is also communicably coupled to the air source 1914 to control generation of a fluid flow and a speed of the fluid flow, such as by activating or deactivating and altering a speed of operation of the air source 1914. The controller 1918 communicates with the various components via a wired or wireless connection.

Figure 20:
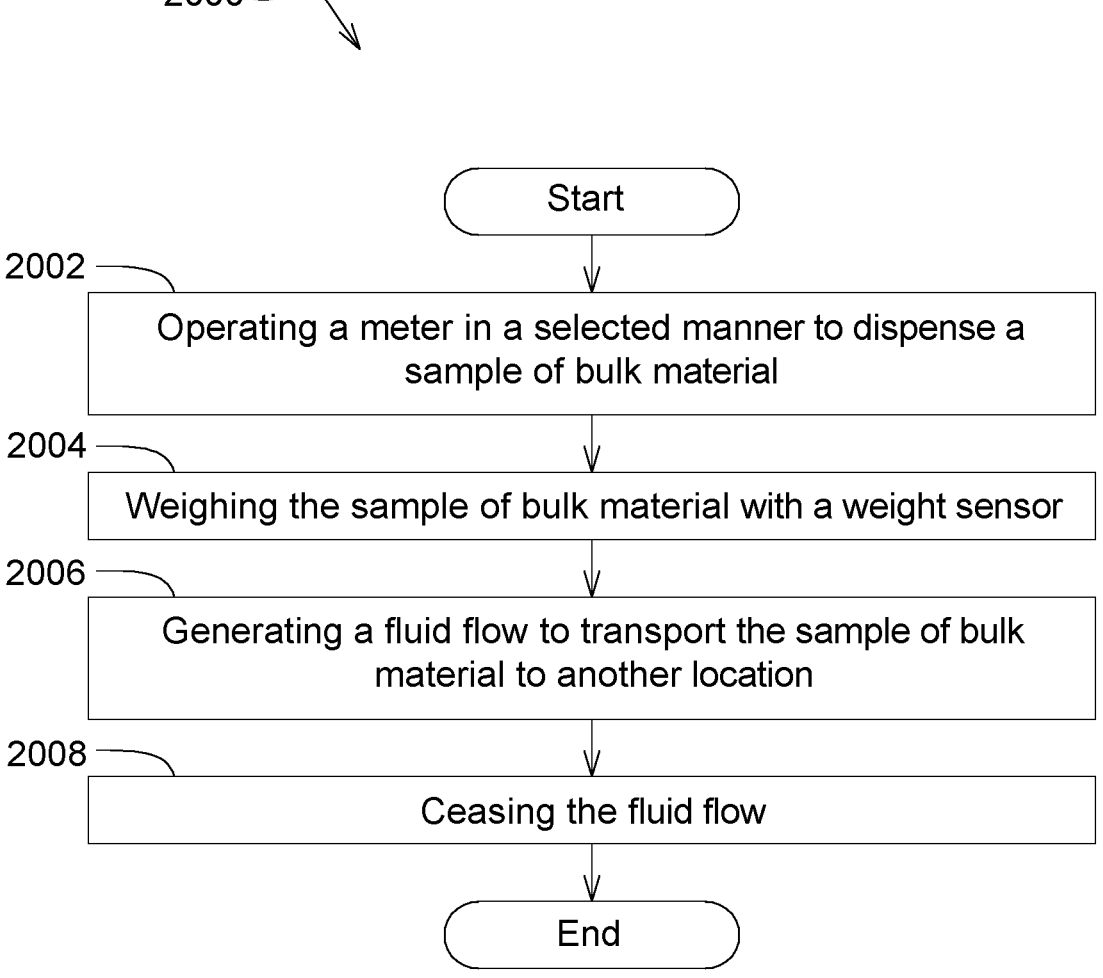
FIG. 20 is a flowchart of another example method for calibrating a meter, according to some implementations of the present disclosure.

With reference to FIG. 20, an example method 2000 of operation of the calibration system 1900 is described. In advance of performing a calibration operation, the controller 1918, either automatically or in response to a user input, configures the calibration system 1900 for the calibration operation. For example, the controller 1918 may configure one or more of the valves 1910 so that material dispensed by a meter 1904 is directed to conduit 1908. The controller 1918 may also verify whether the air source 1914 is operating and, if so, cease operation of the air source 1914 so that a fluid flow is not present within the conduit 1908. Also prior to a calibration operation, the meter 1904 may be primed. For example, the controller 1918, either automatically or in response to user input, operates the meter 1904 for a selected number of cycles or for a selected period of time, for example, to ensure that the meter 1904 is filled with bulk materials and that no voids exist that would otherwise provide inaccurate metering results.

At 2002, the meter 1904 is operated in a selected manner to dispense a sample of bulk material from the tank 1902. For example, automatically or in response to a user input, the controller 1918 communicates with the meter 1904 for in a selected manner. The selected manner of operation of the meter 1904 includes, for example, operating the meter 1904 for a selected number of cycles at a selected speed of operation, e.g., a selected rotational speed, or operating the meter 1904 for a selected period of time. The controller 1918 stops operation of the meter 1904 when the selected manner of operation has concluded.

Although operation of a single meter is described, in some implementations, the controller 1918 operates multiple meters 1904, either simultaneously or in sequence, e.g., serially. Operation of a single meter 1904 is described, but it is to be understood that the disclosure encompasses multiple meters 1904 being operated together.

At 2004, the sample of bulk material dispensed by the meter 1904 is weighed by the weight sensor 1912, and an output of the weight sensor 1912 representing the weight of the sample of bulk material is transmitted to the controller 1918. The controller 1918 uses the selected manner of operation of the meter 1904 and the sensed weight to determine a calibration factor, such as an MDV. With the sample of bulk material weighed, at 2006, the controller 1918 operates the air source 1914 to generate a fluid flow through the conduit 1908. The fluid flow transports the sample of bulk material to another location, such as the tank 1902 from which the sample was dispensed or a different tank 1902. As explained above, the sample of bulk material may be returned to the tank 1902 via a conduit system similar to that described in FIG. 16. At 2008, the fluid flow is ceased. The controller 1918 signals the air source 1914 to cease operation, for example, after a selected period of time, when a weight sensed by the weight sensor 1912 achieves a selected value or is within a range of values, or based on another criterion.

In some implementations, a meter, such as one or more of the meters described herein, may include one or more sensors to that detects when a meter is empty, such as when a tank feeding the meter is empty, when an obstruction exists that prevents flow of material to the meter, where a failure (e.g., mechanical failure) exists, or some other issue the prevents flow or adequate flow of bulk material to a meter. Example sensors to detect an unfilled meter cavity (such as due to the presence of a blockage) that would affect calibration include capacitive proximity sensors, inductive proximity sensors, piezoelectric sensors (e.g., piezoelectric sensors that sense vibration or impact), ultrasonic proximity sensors, optical sensors (e.g., beam-break sensing technologies), microwave sensors, vision sensor systems (e.g., one or more cameras), and acoustic sensors (e.g., impact sensing sensors). In some instances, a control system, which may be similar to one or more of the control systems described herein or encompassed by the present disclosure, detects when flow of bulk material to or from a meter is disrupted. A meter may include an actuator to actuate the meter. For example, the meter may include a motor, such as an electric motor or other type of motor, to actuator the meter. A meter fill condition may be determined by a magnitude of a torque on the electric motor or back electromotive force (EMF). A back EMF of the motor that falls below a selected threshold may indicate a meter that has an inadequate fill condition. If an inadequate meter fill condition is detected, such as with an electronic sensor that monitors motor torque or back EMF, by a control system, the control system is operable to interrupt a calibration operation since inadequate filling of the meter results in an erroneous calibration factor. Thus, when an inadequate meter fill condition is detected, a control system can perform ameliorative actions, such as resetting to perform a new calibration operation, performing a meter priming operation, providing an alert to a user, or some other operation.

In some instances, an operating speed of a meter is determined using a prior or default calibration factor, such as a recently determined calibration factor (collectively referred to as "prior MDV"), a previously determined or default application rate, and a default or an average or historical vehicle speed (e.g., a typical vehicle speed associated with a material type to be deposited).

An operating speed of a meter may be determined to improve a commodity delivery efficiency. For example, by refining an operating speed of a meter, an amount of commodity delivered to a field during an agricultural operation is conformed to a desired delivery rate. The desired delivery rate can ensure that delivery of the material is neither too great nor too little for the intended operation. Thus, commodity is conserved, or an application rate of commodity to a field is maintained at a desired level.

The operating speed of a meter may be iteratively determined to continuously improve an agricultural application operation. In some implementations, a speed at which a meter is to be operated is determined using the following equation:

$$S_T = R_T \cdot GS_M \cdot W_H / CF_D \qquad \text{(Equation 1)}$$

where $S_T$ is the target operating speed of the meter; $R_T$ is the target commodity application rate; $GS_M$ is the ground speed of an agricultural machine (e.g., a planter) moving through a field; $W_T$ is a width of a tool or portion of a width of a tool performing the commodity application for which a meter is supplying commodity; and $CF_D$ is a default calibration factor (e.g., an MDV). In some instances, the target operating speed ($S_T$) of the meter is a rotational speed at which a roller or rotatable cylinder of a meter is rotated when dispensing material.

Figure 22:
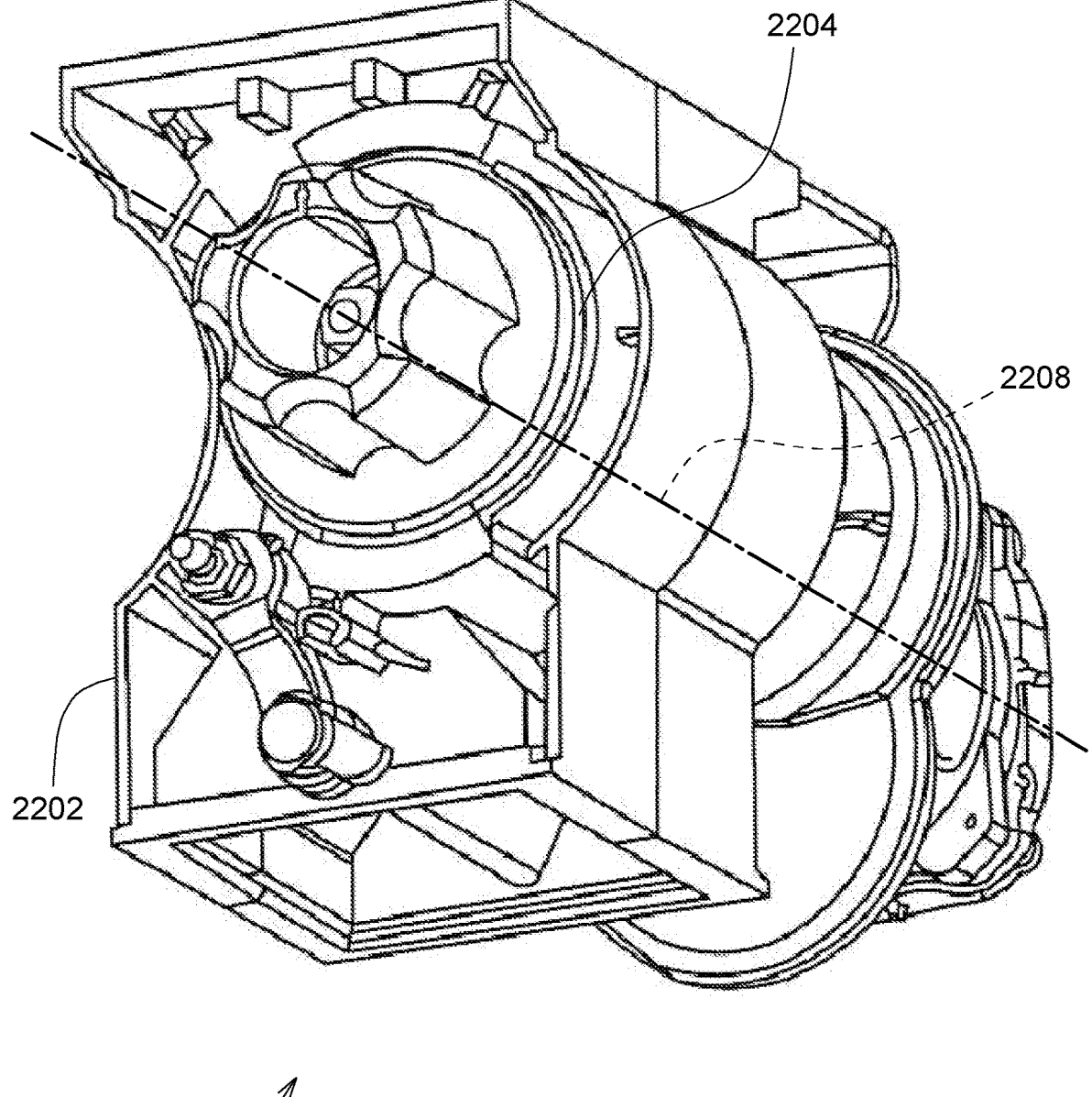
FIG. 22 is an oblique view of an example meter, according to some implementations of the present disclosure.
Figure 23:
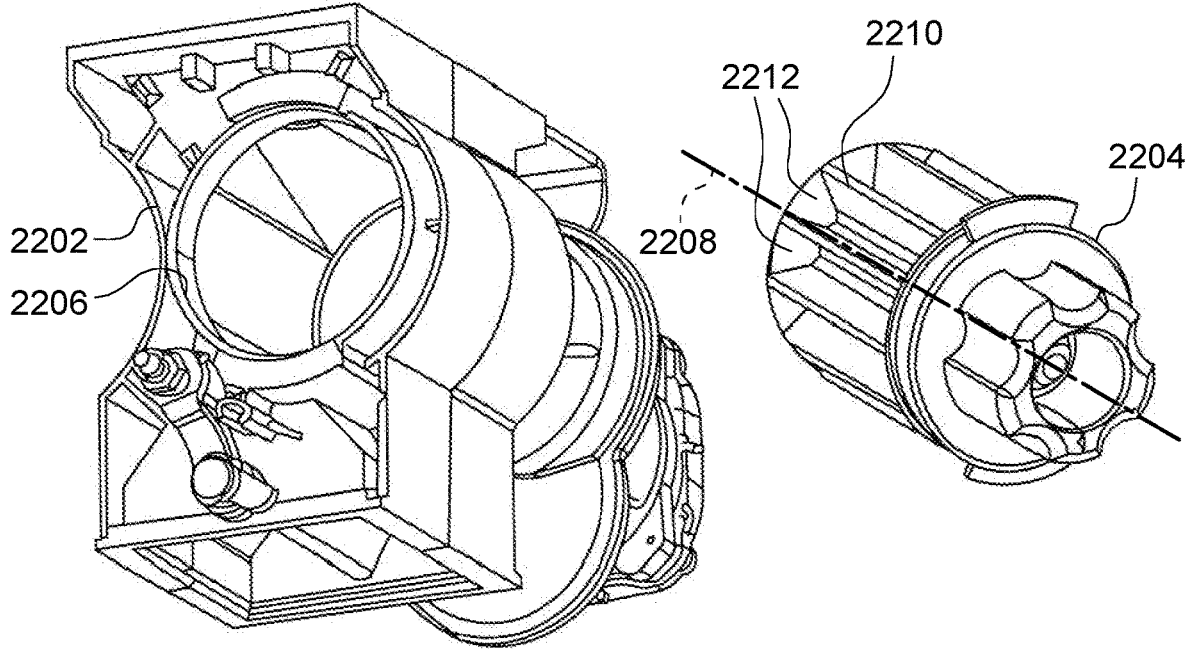
FIG. 23 is an exploded view of the meter of FIG. 22.

FIGS. 22 and 23 show an example commodity meter 2200 within the scope of the present disclosure. FIG. 22 is an oblique view of the meter 2200, and FIG. 23 is an exploded view of the meter 2200. In some implementations, the meter 304, described earlier, is similar to meter 2200. The meter 2200 is a volumetric meter that operates to dispense commodity for application to a field during an agricultural operation. The meter 2200 includes a housing 2202 and a roller 2204 that is received into a bore 2206 formed within the housing 2202. The roller 2204 is rotatable within the housing 2202 about an axis of rotation 2208. The roller 2204 is a cylindrical component and includes partitions or flutes 2210 that defines cavities 2212 in which a commodity is received during operation of the meter 2200. In the illustrated example, the cavities 2212 are circumferentially arranged. The number, size, and shape of the flutes 2210 may vary to alter a number, size, and shape of the defined cavities 2212. For example, in some implementations, a plurality of different types of rollers 2204 are receivable into the housing 2202. The different rollers 2204 may be configured to handle different commodity types, different operational speeds, or both, for example. Further, different rollers 2204 may be configured to dispense different amounts of commodity per each revolution of the roller. Consequently, different rollers 2204 may be better suited for dispensing some commodities than others or for dispensing a particular commodity at a particular rotational speed or range of rotational speeds.

The target speed of the meter (e.g., the speed of rotation of a roller of the meter, which may be similar to roller 2204 or 304) may be iteratively determined and refined over time so that the distribution of the commodity is improved, e.g., so that distribution of the commodity satisfies a target distribution rate. Continuously adjusting the meter operating speed in this way prevents excess use of commodity over an area (i.e., waste of commodity) or underutilization of the commodity over an area, which results in underutilization and potentially lowered productivity of the land.

An initial target speed ($S_T$) (for example, in the context of a first use of a new agricultural air seeder) used to perform a meter calibration is determined using Equation 1. Where the meter being calibration has not yet been calibrated, a representative or default calibration factor is used. For example, a calibration factor used for a similar meter with a similar commodity may be used where a prior calibration factor for the particular meter is not available. The target commodity application rate ($R_T$) is a desired rate of application of a commodity. The ground speed ($GS_M$) is the anticipated speed of the agricultural machine (e.g., planter) over the ground, and the width of the tool or portion of the width of the tool served by the meter at issue.

In some implementations, the $S_T$ is determined using the anticipated $R_T$, the $GS_M$ of the planter (or applicable agricultural machine) along the ground, the width or portion of the width of the planter, W, and the default $CF_D$. Using these values, the initial $S_T$ is determined. This value is then used to perform a calibration operation that results in a new calibration factor. The new calibration factor is determined using the following equation:

$$CF_N = \frac{W}{R} \qquad \text{(Equation 2)}$$

where $CF_N$ is the new calibration factor; W is the measured weight of a commodity dispensed during the calibration operation, and R is the number of revolutions of the meter that results in the dispensing of the weight, W, of the commodity. The new calibration factor is then utilized in Equation 1 to determine a new target meter speed ($S_T$) of the meter. In this calculation, all of the other values are the same, i.e., the value the target application rate ($R_T$), the value for ground speed (GSM), and the tool width value ($W_T$) are the same as used previously. This calculation renders a new target meter speed ($S_T$).

An operator performs an agricultural operation using the determined new calibration factor ($CF_N$) and the new target speed ($S_T$) of the meter. The meter is operated during the agricultural operation utilizing these values. After a portion of the agricultural operation has been performed, for example, an operator gauges whether the commodity is being dispensed at the desired application rate. In some instances, this determination is made via a computer system, whether onboard or remote of the agricultural machine. Whether the commodity is being dispensed at the desired rate may be based, for example, on a change in weight of commodity provided onboard of the planter and an area of a field over which the commodity has been dispensed. If the actual commodity application rate differs from the target commodity application rate (e.g., if the actual commodity application rate is not within a selected variance from the target commodity application rate), then the operator may cease the agricultural operation (for example, in those cases where only a portion of the agricultural operation has been performed), and a new meter calibration is performed.

During the performance of the agricultural operation, a ground speed of the planter or other agricultural machine may have varied from the estimated ground speed originally used. This actual ground speed used during the agricultural operation is used to determine a new target meter speed ($S_T$) using Equation 1, with the other variables being kept the same, assuming the target commodity rate ($R_T$) and tool width ($W_T$) has not changed. The calibration factor (CF) used is the same calibration factor previously used during the course of the portion of the agricultural operation previously performed, which is $CF_N$ in this case. The new target meter speed is calculated and used to perform a new calibration operation, which produces a new calibration factor according to Equation 2. The agricultural operation is continued using the new target meter speed and new calibration factor values.

The above process can be used iteratively. For example, during the initial performance of the agricultural operation, the actual commodity application rate may vary from the target commodity application rate by ten percent (10%). After determining a new calibration factor and target meter speed as described above, the continuation of the agricultural operation may result in a variance of the actual commodity application rate from the target commodity application rate of five percent (5%). The agricultural process may be stopped again, and another iteration performed to determine a new target meter speed and calibration factor using the actual operating conditions, e.g., actual ground speed occurring during the most recent portion of the agricultural operation. These new values can, once again, be used during the continuation of the agricultural operation. This iterative process can be performed any number of times as desired to improve the commodity application rate and, hence, improve performance of the meter and the agricultural operation.

A computer system within the scope of the present disclosure, such as controller 449; computer systems 452 and 820; control systems 1638 or 1916; or some other computer system within the scope of the present disclosure, whether onboard of the agricultural machine (such as an air cart, tractor, or other machine used to perform a commodity dispensing operation) or remotely located from the agricultural machine, can also include a commodity reference utility to verify whether a selected meter roller is appropriate for a particular commodity. In some implementations, a commodity reference utility is in the form of a lookup table. In other implementations, the commodity reference utility is an algorithm, a mathematical relationship, or another reference structure that is operable to verify whether a selected meter roller is appropriate or recommended for a particular commodity. In the context of seed types as the commodity, one or more rollers of a meter may be better suited to dispense particular seed types than others. For example, a size, shape, or mass of particular seed may cause one or more rollers of a meter to perform poorly with other rollers to perform more favorably.

FIG. 24 is an example lookup table 2400 that is used to determine whether a selected roller is appropriate or recommended for a particular commodity. The table 2400 is also utilized to determine whether a selected meter speed is appropriate or recommended for a particular commodity. The table 2400 includes a first column 2402 that identifies various commodities. Column 2404 identifies meter rollers that are preferred for the corresponding commodity listed in column 2402. Column 2406 identifies a meter speed that is preferred for the corresponding commodity and roller listed in columns 2402 and 2404, respectively. Operation of a meter with a particular roller at some speeds or range of speeds may result in inadequate dispensing of a commodity. For example, if a meter with a particular meter is rotated too quickly, the cavities formed by the roller may not properly fill. As a result, with inadequate filling of the roller, the meter dispenses a reduced amount of commodity. Therefore, if a selected meter roller or meter speed for a selected commodity does not conform to those listed for a selected commodity provided in column 2402, then an alert or error can be provided to an operator. The error or alert may be provided visually (such as via a display), audibly (such as via a speaker), or haptically (such as via a vibratory device).

Figure 25:
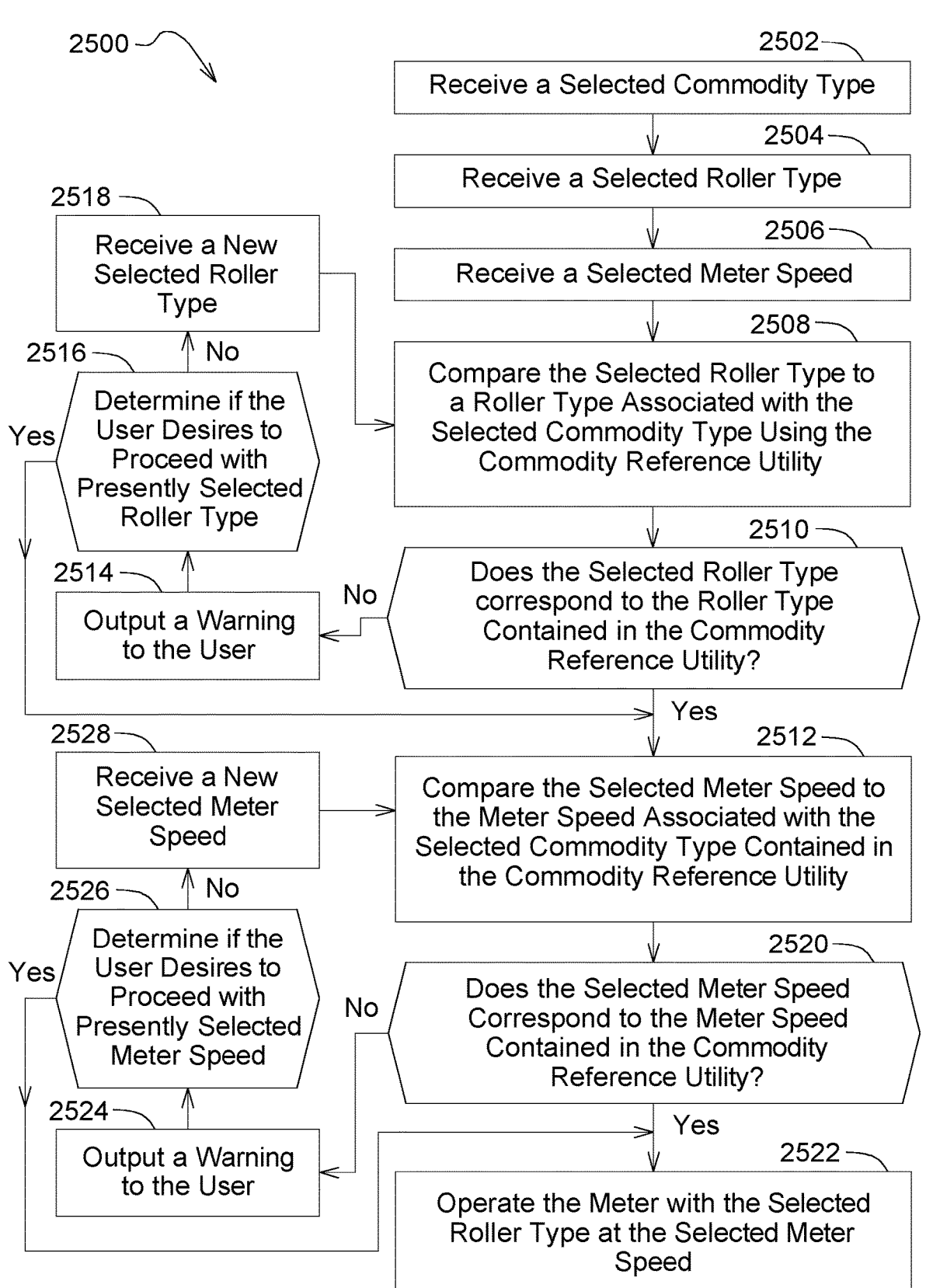
FIG. 25 is a flowchart of an example method for verifying whether a selected meter roller or meter speed is recommended or appropriate for a particular commodity, according to some implementations of the present disclosure.

FIG. 25 is a flowchart that illustrates an example method 2500 of verifying whether a selected meter roller or meter speed is recommended or appropriate for a particular commodity. Although the method 2500 is described in the context of a lookup table, the method 2500 is also applicable to other types of commodity reference utilities within the scope of the present disclosure. At 2502, a commodity to be dispensed for application to a field is selected. The selected commodity is received into a computer system, which may be similar to one or more computer systems within the scope of the present disclosure. In some instances, the selected commodity is inputted into a computer system similar to a computer system described herein. In some implementations, the commodity is automatically sensed, such as with a detection system that senses a commodity with a sensor and detect a type of commodity based on the sensor data. In some implementations, a commodity type is inputted via manually by a user or via an electronic process, such as by scanning a bar code, a quick response or QR code, or some other type of electronic media that contains an identification of the commodity. For example, an identification marker may be provided on packaging associated with a commodity. At 2504, a roller of a meter, such as a volumetric meter, is selected to dispense a commodity during an agricultural operation. In some implementations, an identifier for the selected meter roller may be inputted into the computer system to inform the computer system of the type of meter roller selected. In some instances, the meter roller may be automatically detected, such as with the use of a sensor, when the roller is installed into the meter. A signal from the sensor is received by a computer system, for example, and used to identify the type of roller installed in the meter. At 2506, a meter operating speed is selected. The selected meter speed in received into the computer system. In some instances, the meter speed is selected using a technique that is the same or similar to one described below.

At 2508, the selected roller type is compared to a roller type associated with the selected commodity. For example, the selected roller type is compared to a recommended roller type listed in a lookup table that is associated with the selected commodity. Again, other types of reference utilities may be used. At 2510, a determination is made as to whether the selected roller type corresponds to the listed meter roller type associated with the selected commodity. If the selected roller type does correspond to the listed roller type associated with the selected commodity, then the method 2500 moves to 2512 where the selected meter speed is compared to a recommended meter speed listed in the lookup table. If the selected roller type does not correspond with the recommended roller type, then the method 2500 moves to 2514 where an alert is presented to the user. The alert may be visual, audible, haptic, or a combination of these. At 2516, the user is prompted as to whether to continue with the selected roller type. If the user desires to continue with the selected roller type, the method 2500 moves to 2512. If the user desires to select a new roller type, the method 2500 moves to 2518, where a new roller type is selected and received, and the method 2500 returns to 2508.

At 2512, the selected meter speed is compared to a recommended meter speed listed in the lookup that corresponds to the selected commodity. At 2520, a determination is made to whether the selected meter speed corresponds to the recommended meter speed listed in the lookup table. If there is correspondence between the two, the method 2500 moves to 2522 where the meter is operated to dispense the selected commodity using the presently selected roller type and meter speed. If there is no correspondence between the selected meter speed and the recommended meter speed, the method 2500 moves to 2524 where an alert is presented to the user, such as in one or more of the manners described earlier. At 2526, the user is prompted as to whether to continue with the selected meter speed or select a new meter speed. If the user desires to continue with the selected meter speed, the method 2500 moves to 2522. If the user desires to select a new meter speed, the method 2500 moves to 2528, and a new meter speed is selected and received. With the new selected meter speed, the method 2500 moves to 2522 where the presently selected roller type and meter speed are used to distribute the selected commodity.

Although the method 2500 is described in the context of the described features, it is within the scope of the present disclosure that one or more of the described features may be omitted or that one or more additional features may be added. Further, in some implementations, the order of the features may be altered. Thus, the method 2500 may be modified as still remain within the scope of the present disclosure.

In some instances, prior to performing a calibration operation, certain considerations are taken into consideration. For example, a number of cycles of operation of a meter, an amount of time to perform the calibration process, and a volume of material dispensed during a calibration operation can be important considerations. For example, the number of cycles (e.g., revolutions) of the meter may be important in order to get a satisfactory representation of the meter's operation. Operating the meter during the calibration operation for fewer than a minimum number of cycles for an accurate representation of the meter can result in an inaccurate calibration.

Also, an amount of time to perform the calibration operation can be important, because, for example, a calibration operation that takes an excessive amount of time delays an agricultural operation. This delay increases costs, such as labor costs, or can disrupt operation schedules, such as due to inclement weather or extending operations into another day. Further, a volume of material (and, hence, a mass of material) dispensed during a calibration operation can also be important. For example, a weight or mass sensor (e.g., a scale) used to measure the amount of commodity dispensed may have a functional limitation that limits how much material the sensor can accurately measure. An amount of material in excess of this functional limitation would also result in an inaccurate calibration operation. In some instances, the weight or mass sensor may have a lower limit, and a weight or mass of the commodity below the lower limit may result in an inaccurate output from the sensor.

Therefore, in some instances, one or more of a number of cycles of operation of a meter, a time for meter calibration, and a material volume dispensed during a calibration operation can be determined prior to a meter calibration operation. A target number of cycles of a meter can be determined using the following equation:

$$C_T = \frac{W_T}{CF_R} \qquad \text{(Equation 3)}$$

where $C_T$ is a target number of cycles (e.g., revolutions) performed by the meter during the calibration operation; $W_T$ is a target weight to be dispensed by the meter; and $CF_R$ is a representative calibration factor. In some instances, the target weight is a minimum weight of commodity dispensed to perform an accurate calibration. A minimum weight is a weight of commodity above a selected threshold that produces an accurate calibration. The representative calibration factor, $CF_R$, can be a recent calibration factor obtained for the meter, such as the most recently obtained calibration factor, or some other calibration factor that is representative of or believed to be representative of the meter being calibrated. For example, a recently determined or most recently determined MDV can be used.

An amount of time to complete a calibration can be determined with the following equation:

$$T_{Cal} = \frac{C_T}{S_T} \qquad \text{(Equation 4)}$$

where $T_{Cal}$ is the time to complete the calibration operation; $C_T$ is the target number of cycles (e.g., revolutions); and $S_T$ is the target operating speed. The target operating speed, $S_T$, may be determined using Equation 1, provided above, and the target number of cycles, $C_T$, may be determined using Equation 3, also provided above. In this way, a user can determine a time to complete a calibration operation and judge whether the time is satisfactory.

The following equation can be used to determine a target volume of commodity dispensed during a calibration operation. The target commodity volume can also be used to determine a target weight or mass of the dispensed commodity. The target volume and the target weight or mass can be used to judge whether a collection container and weight sensor are adequate for the calibration operation. The target volume is determined as follows:

$$V_T = \frac{C_T \cdot CF_R}{\rho_C} \qquad \text{(Equation 5)}$$

where $V_T$ is the target volume of the commodity dispensed during a calibration operation; $C_T$ is the target number of cycles (e.g., revolutions) of the meter during the calibration operation; $CF_R$ is the representative calibration factor of the meter; and $\rho_C$ is the density of the commodity being dispensed by the meter. The target number of cycles, $C_T$, can be determined using Equation 3, above, and $CF_R$ can be the same calibration factor described above in the context of Equation 3.

A target volume, VT, determined using Equation 5, can be compared to a volume of a container used to collect the commodity dispensed during a calibration operation and determine whether the container size is adequate. Similarly, using the density of the commodity, the $V_T$ can be converted to a target mass or weight of the commodity to be dispensed during the calibration operation. This mass or weight can be compared to a limitation of the weight or mass sensor to verify that the sensor is adequately sized to accurately sense the target mass or weight of commodity dispensed.

Each of these values can be prioritized. For example, a user can prioritize a time to complete the calibration operation over one or more of the other two considerations described above. Thus, a user can prioritize these factors, whether prioritizing time, sample size, or sample weight, in order to perform a desired calibration operation.

Without in any way limiting the scope, interpretation, or application of the claims appearing below, a technical effect of one or more of the example implementations disclosed herein is providing automated calibration systems and methods that produce increased meter calibration accuracy.

Another technical effect of one or more of the example implementations disclosed herein is calibrating commodity meters that involves reduced physical labor by a user. Another technical effect of one or more of the example implementations disclosed herein is calibrating a meter with reduced material waste.

Figure 21:
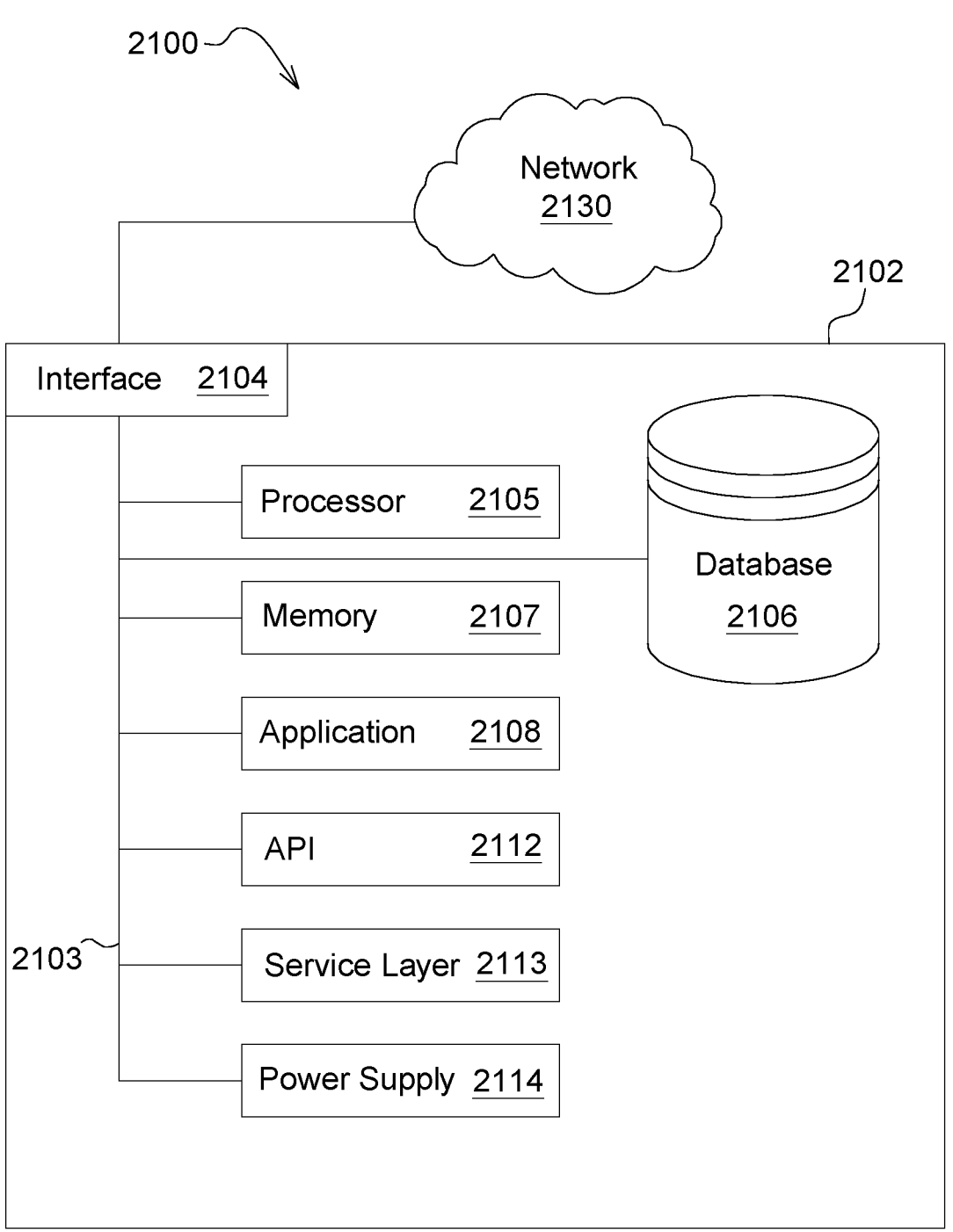
FIG. 21 is a block diagram illustrating an example computer system used to provide computational functionalities associated with described algorithms, methods, functions, processes, flows, and procedures as described in the present disclosure, according to some implementations of the present disclosure.

FIG. 21 is a block diagram of an example computer system 2100 used to provide computational functionalities associated with described algorithms, methods, functions, processes, flows, and procedures described in the present disclosure, according to some implementations of the present disclosure. The illustrated computer 2102 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2102 can include input devices such as keypads, keyboards, and touch screens that can accept user information. Also, the computer 2102 can include output devices that can convey information associated with the operation of the computer 2102. The information can include digital data, visual data, audio information, or a combination of information. The information can be presented in a graphical user interface (UI) (or GUI).

The computer 2102 can serve in a role as a client, a network component, a server, a database, a persistency, or components of a computer system for performing the subject matter described in the present disclosure. The illustrated computer 2102 is communicably coupled with a network 2130. In some implementations, one or more components of the computer 2102 can be configured to operate within different environments, including cloud-computing-based environments, local environments, global environments, and combinations of environments.

At a high level, the computer 2102 is an electronic computing device operable to receive, transmit, process, store, and manage data and information associated with the described subject matter. According to some implementations, the computer 2102 can also include, or be communicably coupled with, an application server, an email server, a web server, a caching server, a streaming data server, or a combination of servers.

The computer 2102 can receive requests over network 2130 from a client application (for example, executing on another computer 2102). The computer 2102 can respond to the received requests by processing the received requests using software applications. Requests can also be sent to the computer 2102 from internal users (for example, from a command console), external (or third) parties, automated applications, entities, individuals, systems, and computers.

Each of the components of the computer 2102 can communicate using a system bus 2103. In some implementations, any or all of the components of the computer 2102, including hardware or software components, can interface with each other or the interface 2104 (or a combination of both), over the system bus 2103. Interfaces can use an application programming interface (API) 2112, a service layer 2113, or a combination of the API 2112 and service layer 2113. The API 2112 can include specifications for routines, data structures, and object classes. The API 2112 can be either computer-language independent or dependent. The API 2112 can refer to a complete interface, a single function, or a set of APIs.

The service layer 2113 can provide software services to the computer 2102 and other components (whether illustrated or not) that are communicably coupled to the computer 2102. The functionality of the computer 2102 can be accessible for all service consumers using this service layer. Software services, such as those provided by the service layer 2113, can provide reusable, defined functionalities through a defined interface. For example, the interface can be software written in JAVA, C++, or a language providing data in extensible markup language (XML) format. While illustrated as an integrated component of the computer 2102, in alternative implementations, the API 2112 or the service layer 2113 can be stand-alone components in relation to other components of the computer 2102 and other components communicably coupled to the computer 2102. Moreover, any or all parts of the API 2112 or the service layer 2113 can be implemented as child or sub-modules of another software module, enterprise application, or hardware module without departing from the scope of the present disclosure.

The computer 2102 includes an interface 2104. Although illustrated as a single interface 2104 in FIG. 21, two or more interfaces 2104 can be used according to particular needs, desires, or particular implementations of the computer 2102 and the described functionality. The interface 2104 can be used by the computer 2102 for communicating with other systems that are connected to the network 2130 (whether illustrated or not) in a distributed environment. Generally, the interface 2104 can include, or be implemented using, logic encoded in software or hardware (or a combination of software and hardware) operable to communicate with the network 2130. More specifically, the interface 2104 can include software supporting one or more communication protocols associated with communications. As such, the network 2130 or the interface's hardware can be operable to communicate physical signals within and outside of the illustrated computer 2102.

The computer 2102 includes a processor 2105. Although illustrated as a single processor 2105 in FIG. 21, two or more processors 2105 can be used according to particular needs, desires, or particular implementations of the computer 2102 and the described functionality. Generally, the processor 2105 can execute instructions and can manipulate data to perform the operations of the computer 2102, including operations using algorithms, methods, functions, processes, flows, and procedures as described in the present disclosure.

The computer 2102 also includes a database 2106 that can hold data for the computer 2102 and other components connected to the network 2130 (whether illustrated or not). For example, database 2106 can be an in-memory, conventional, or a database storing data consistent with the present disclosure. In some implementations, database 2106 can be a combination of two or more different database types (for example, hybrid in-memory and conventional databases) according to particular needs, desires, or particular implementations of the computer 2102 and the described functionality. Although illustrated as a single database 2106 in FIG. 21, two or more databases (of the same, different, or combination of types) can be used according to particular needs, desires, or particular implementations of the computer 2102 and the described functionality. While database 2106 is illustrated as an internal component of the computer 2102, in alternative implementations, database 2106 can be external to the computer 2102.

The computer 2102 also includes a memory 2107 that can hold data for the computer 2102 or a combination of components connected to the network 2130 (whether illustrated or not). Memory 2107 can store any data consistent with the present disclosure. In some implementations, memory 2107 can be a combination of two or more different types of memory (for example, a combination of semiconductor and magnetic storage) according to particular needs, desires, or particular implementations of the computer 2102 and the described functionality. Although illustrated as a single memory 2107 in FIG. 21, two or more memories 2107 (of the same, different, or combination of types) can be used according to particular needs, desires, or particular implementations of the computer 2102 and the described functionality. While memory 2107 is illustrated as an internal component of the computer 2102, in alternative implementations, memory 2107 can be external to the computer 2102.

The application 2108 can be an algorithmic software engine providing functionality according to particular needs, desires, or particular implementations of the computer 2102 and the described functionality. For example, application 2108 can serve as one or more components, modules, or applications. Further, although illustrated as a single application 2108, the application 2108 can be implemented as multiple applications 2108 on the computer 2102. In addition, although illustrated as internal to the computer 2102, in alternative implementations, the application 2108 can be external to the computer 2102.

The computer 2102 can also include a power supply 2114. The power supply 2114 can include a rechargeable or non-rechargeable battery that can be configured to be either user- or non-user-replaceable. In some implementations, the power supply 2114 can include power-conversion and management circuits, including recharging, standby, and power management functionalities. In some implementations, the power-supply 2114 can include a power plug to allow the computer 2102 to be plugged into a wall socket or a power source to, for example, power the computer 2102 or recharge a rechargeable battery.

There can be any number of computers 2102 associated with, or external to, a computer system containing computer 2102, with each computer 2102 communicating over network 2130. Further, the terms "client," "user," and other appropriate terminology can be used interchangeably, as appropriate, without departing from the scope of the present disclosure. Moreover, the present disclosure contemplates that many users can use one computer 2102 and one user can use multiple computers 2102.

Described implementations of the subject matter can include one or more features, alone or in combination.

For example, in a first implementation, a computer-implemented method, including operating a bulk material meter to dispense an amount of bulk material into a container coupled to the meter, the container including an electronic weight sensor; sensing, with the electronic weight sensor, a weight of the bulk material received into the container; transmitting the sensed weight of the bulk material to an electronic controller of the meter; and calibrating the meter using the sensed weight of the bulk material.

The foregoing and other described implementations can each, optionally, include one or more of the following features:

A first feature, combinable with any of the following features, wherein operating a bulk material meter to dispense an amount of bulk material into a container coupled to the meter includes operating the meter a selected number of cycles or for a selected period of time.

A second feature, combinable with any of the previous or following features, wherein the container includes a coupler and a canister movably coupled to the coupler and wherein sensing, with an electronic weight sensor, a weight of the bulk material received into the container includes sensing an amount of displacement of the canister relative to the coupler.

A third feature, combinable with any of the previous or following features, wherein transmitting the sensed weight of the bulk material to an electronic controller of the meter includes transmitting the sensed weight of the bulk material via a wired electrical connection between the electronic weight sensor and the electronic controller of the meter.

A fourth feature, combinable with any of the previous or following features, wherein the wired electrical connection includes an electrical connector of the container.

A fifth feature, combinable with any of the previous or following features, wherein transmitting the sensed weight of the bulk material to an electronic controller of the meter includes transmitting the sensed weight of the bulk material via a wireless electrical connection between the electronic weight sensor and the electronic controller of the meter.

A sixth feature, combinable with any of the previous or following features, wherein calibrating the meter using the sensed weight of the bulk material includes altering a rate of operation of the meter.

A seventh feature, combinable with any of the previous or following features, wherein the meter is a volumetric meter.

An eight feature, combinable with any of the previous or following features, wherein the electronic weight sensor includes a plurality of electronic weight sensors and wherein sensing, with an electronic weight sensor, a weight of the bulk material received into the container includes sensing a weight of the bulk material with the plurality of electronic weight sensors.

A nineth feature, combinable with any of the previous features, wherein sensing a weight of the bulk material with the plurality of electronic weight sensors includes summing the sensed weights sensed by the plurality of electronic weight sensors.

In a second implementation, a non-transitory, computer-readable medium storing one or more instructions executable by a computer system to perform operations including operating a bulk material meter to dispense an amount of bulk material into a container coupled to the meter, the container including an electronic weight sensor; sensing, with the electronic weight sensor, a weight of the bulk material received into the container; transmitting the sensed weight of the bulk material to an electronic controller of the meter; and calibrating the meter using the sensed weight of the bulk material.

The foregoing and other described implementations can each, optionally, include one or more of the following features:

A first feature, combinable with any of the following features, wherein operating a bulk material meter to dispense an amount of bulk material into a container coupled to the meter includes operating the meter a selected number of cycles or for a selected period of time.

A second feature, combinable with any of the previous or following features, wherein the container includes a coupler and a canister movably coupled to the coupler and wherein sensing, with an electronic weight sensor, a weight of the bulk material received into the container includes sensing an amount of displacement of the canister relative to the coupler.

A third feature, combinable with any of the previous or following features, wherein transmitting the sensed weight of the bulk material to an electronic controller of the meter includes transmitting the sensed weight of the bulk material via a wired electrical connection between the electronic weight sensor and the electronic controller of the meter.

A fourth feature, combinable with any of the previous or following features, wherein the wired electrical connection includes an electrical connector of the container.

A fifth feature, combinable with any of the previous or following features, wherein transmitting the sensed weight of the bulk material to an electronic controller of the meter includes transmitting the sensed weight of the bulk material via a wireless electrical connection between the electronic weight sensor and the electronic controller of the meter.

A sixth feature, combinable with any of the previous or following features, wherein calibrating the meter using the sensed weight of the bulk material includes altering a rate of operation of the meter.

A seventh feature, combinable with any of the previous or following features, wherein the meter is a volumetric meter.

An eight feature, combinable with any of the previous or following features, wherein the electronic weight sensor includes a plurality of electronic weight sensors and wherein sensing, with an electronic weight sensor, a weight of the bulk material received into the container includes sensing a weight of the bulk material with the plurality of electronic weight sensors.

A nineth feature, combinable with any of the previous features, wherein sensing a weight of the bulk material with the plurality of electronic weight sensors includes summing the sensed weights sensed by the plurality of electronic weight sensors.

In a third implementation, a computer-implemented system, including one or more processors and a non-transitory computer-readable storage medium coupled to the one or more processors and storing programming instructions for execution by the one or more processors, the programming instructions instructing the one or more processors to operate a bulk material meter to dispense an amount of bulk material into a container coupled to the meter, the container including an electronic weight sensor; sense, with the electronic weight sensor, a weight of the bulk material received into the container; transmit the sensed weight of the bulk material to an electronic controller of the meter; and calibrate the meter using the sensed weight of the bulk material.

The foregoing and other described implementations can each, optionally, include one or more of the following features:

A first feature, combinable with any of the following features, wherein the programming instructions instructing the one or more processors to operate a bulk material meter to dispense an amount of bulk material into a container coupled to the meter includes programming instructions instructing the one or more processors to operate the meter a selected number of cycles or for a selected period of time.

A second feature, combinable with any of the previous or following features, wherein the container includes a coupler and a canister movably coupled to the coupler, and wherein the programming instructions instructing the one or more processor to sense, with an electronic weight sensor, a weight of the bulk material received into the container includes programming instructions instructing the one or more processors to sense an amount of displacement of the canister relative to the coupler.

A third feature, combinable with any of the previous or following features, wherein the programming instructions instructing the one or more processors to transmit the sensed weight of the bulk material to an electronic controller of the meter include programming instructions instructing the one or more processors to transmit the sensed weight of the bulk material via a wired electrical connection between the electronic weight sensor and the electronic controller of the meter.

A fourth feature, combinable with any of the previous or following features, wherein the wired electrical connection includes an electrical connector of the container.

A fifth feature, combinable with any of the previous or following features, wherein the programming instructions instructing the one or more processors to transmit the sensed weight of the bulk material to an electronic controller of the meter include programming instructions instructing the one or more processors to transmit the sensed weight of the bulk material via a wireless electrical connection between the electronic weight sensor and the electronic controller of the meter.

A sixth feature, combinable with any of the previous or following features, wherein the programming instructions instructing the one or more processors to calibrating the meter using the sensed weight of the bulk material include programming instructions instructing the one or more processors to alter a rate of operation of the meter.

A seventh feature, combinable with any of the previous or following features, wherein the meter is a volumetric meter.

An eight feature, combinable with any of the previous or following features, wherein the electronic weight sensor includes a plurality of electronic weight sensors and wherein the programming instructions instructing the one or more processors to sense, with an electronic weight sensor, a weight of the bulk material received into the container include programming instructions instructing the one or more processors to sense a weight of the bulk material with the plurality of electronic weight sensors.

A nineth feature, combinable with any of the previous features, wherein the programming instructions instructing the one or more processors to sense a weight of the bulk material with the plurality of electronic weight sensors include programming instructions instructing the one or more processors to sum the sensed weights sensed by the plurality of electronic weight sensors.

Additional examples are also provided. A first example includes the following.

A meter calibration system to perform calibration of a bulk material meter may include a receptacle to receive dispensed bulk material; a conveyor coupled to the receptacle, the conveyor movable to position the receptacle to a location to receive bulk material dispensed from the meter and selectively operable to displace the bulk material received into the receptacle when an amount of bulk material is dispensed into the receptacle; and a weight sensor, coupled to the receptacle, that senses a weight of each amount of the bulk material received into the receptacle.

The meter calibration system may also include an electronic controller that sequentially operates the conveyor to displace the amount of bulk material received into the receptacle a selected distance along a length of the conveyor when a weight of the dispensed amount of bulk material is sensed by the weight sensor.

Each amount of bulk material may include a sample and the selected distance along the length of the conveyor is selected so that the conveyor is able to receive a selected number of samples.

The conveyor of a meter calibration system may be a screw conveyor.

The bulk material may be agricultural bulk material.

The conveyor of a meter calibration system may be sized to simultaneously contain a plurality of the amounts bulk material discretely dispensed into the receptacle.

The meter calibration system may also include an air seeder, and the conveyor may be mounted to the air seeder.

The air seeder of the meter calibration system may include a meter and a tank to store bulk material, and the conveyor may be movable to a first position at which the receptacle is located adjacent to the meter to receive bulk material dispensed from the meter.

The conveyor of the meter calibration system may include a first end and a second end. The receptacle may be provided at the first end, and the conveyor may be movable to the first position and a second position where the second end of the conveyor is positioned to deposit the one or more of the amounts of bulk material within the conveyor to the tank.

The bulk material may be contained within the tank, and the tank may supply the bulk material dispensed by the meter.

A second example includes the following.

A computer-implemented method performed by one or more processors for automatically calibrating a meter may include the operations of operating a bulk material meter to dispense a sample of bulk material into a receptacle disposed at a first end of a conveyor; sensing, with an electronic weight sensor, a weight of the sample of bulk material within the receptacle; calibrating the bulk material meter with the sensed weight; and operating the conveyor to move the sample of bulk material to a selected position along a length of the conveyor.

The computer-implemented method may also include automatically positioning a second end of the conveyor to a position adjacent to an opening in a tank and expelling the sample of bulk material from the second end of the conveyor into the tank via the opening in the tank.

The second end of the conveyor may include a chute, and expelling the sample of bulk material from the second end of the conveyor into the tank via the opening in the tank may include expelling the sample of bulk material from the chute.

Operating the conveyor may include operating the conveyor to sequentially advance a plurality of samples individually received into the receptacle.

The weight sensor may be coupled to the receptacle.

The bulk material may be one of a seed or a fertilizer.

Calibrating the bulk material meter with the sensed weight may include transmitting the sensed weight of the sample of bulk material to a controller of the bulk material meter.

Operating a bulk material meter to dispense a sample of bulk material into a receptacle disposed at a first end of a conveyor may include operating the bulk material meter a selected number of cycles.

The computer-implemented method may also include repeating the operations a selected number of times for a single bulk material meter.

The computer-implemented method may also include repeating the operations a selected number of time for each meter of an agricultural seeder.

A third example includes the following.

A meter calibration system to perform calibration of a bulk material meter may include a tank that stores bulk material; a meter that meters the bulk material from the tank, and a pneumatic distribution system that transports the bulk material discharged from the meter in a first fluid flow. The pneumatic distribution system may include a first passage that extends between the meter and a distribution location, a second passage, and a third passage. The meter calibration system may also include a separator in fluid communication with the pneumatic distribution system to separate the bulk material from the first fluid flow, a compartment that receives the bulk material separated from the fluid flow, the second passage extending between the compartment and the tank and the third passage extending between the meter and the compartment; and a weight sensor that senses a weight of the bulk material in the compartment, the bulk material transported from the compartment to the tank in a second fluid flow.

The meter calibration system may also include an air source configured to generate the first fluid flow and the second fluid flow.

The air source of the meter calibration system may be in fluid communication with the pneumatic distribution system.

The meter calibration system may also include at least one valve that is selectively configurable to provide fluid communication between the air source and one of the distribution location, the separator, and the compartment and an electronic controller. The electronic controller may be communicably coupled to the air source to alter an operating speed of the air source, to the at least one valve to alter the configuration thereof, and to the meter to operate the meter a selected number of cycles.

The electronic controller of the meter calibration system may be operable to operate the meter a selected number of cycles to dispense a sample of the bulk material; operate the air source for a first selected period of time to generate the first fluid flow to transport an entirety of the sample of bulk material to the separator; receive a sensed weight of the sample of bulk material from the weight sensor; position the at least one valve to provide fluid communication between the air source and the compartment; and operate the air source for a second period of time to generate the second fluid flow to transport the entirety of the sample of bulk material from the compartment to the tank.

The pneumatic distribution system of the meter calibration system may also include a first valve that is selectively positionable to divert the first fluid flow to one of the distribution location and the separator.

The pneumatic distribution system of the meter calibration system may also include a first valve that is selectively positionable to divert the first fluid flow one of the distribution location, the separator, and the compartment.

The second passage of the meter calibration system may be coupled with a tank pressurization system that pressurizes the tank to a selected level.

The tank pressurization system of the meter calibration system may include a pressurization passage, and the second passage may be coupled to the pressurization passage at a valve that is biased into a first position that prevents fluid flow from the second passage into the tank and movable into a second position in response to the second fluid flow that prevents fluid flow from the pressurization passage to the tank.

The tank of the meter calibration system may include a plurality of tanks. The second passage may include a plurality of return conduits, and one of the plurality of return conduits may be in fluid communication with a corresponding one of the plurality of tanks.

A fourth example includes the following.

A computer-implemented method for calibrating a meter using bulk material from a tank may include operating a meter in a selected manner to dispense a sample of bulk material from a tank; generating a fluid flow to entrain the sample of bulk material and transport the sample of bulk material to a separator, the sample of bulk material being separated from the fluid flow by the separator and collected in a compartment; receiving a weight of the sample of bulk material from a scale; routing the fluid flow from the compartment to the tank, the routed fluid flow entraining the sample of bulk material in the compartment and transporting the sample of bulk material to the tank; and generating a calibration factor using the received weight of the sample of bulk material.

Generating a calibration factor using the received weight of the sample of bulk material may include calculating a meter displacement value (MDV) using the weight of the sample of bulk material and the selected manner of operation of the meter to dispense the sample of bulk material.

The computer-implemented method may also include calibrating the meter using the calibration factor. Calibrating the meter using the calibration factor may include altering an operating parameter of the meter using the MDV.

Routing the fluid flow from the compartment to the tank may include configuring at least one valve to direct the fluid flow from the separator to the compartment.

Routing the fluid flow from the compartment to the tank may include configuring the at least one valve to direct the fluid flow from the compartment to the tank.

The tank may include a plurality of tanks. Configuring the at least one valve to direct the fluid flow from the compartment to the tank may include routing the fluid flow through a conduit corresponding to a tank of the plurality of tanks from which the bulk material was dispensed by the meter.

The computer-implemented method may also include ceasing generation of the fluid flow after a selected period of time after operation of the meter to dispense the sample of bulk material. The selected period of time may be selected to transport an entirety of the sample of bulk material from the meter to the separator.

Generating a fluid flow to entrain the sample of bulk material and transport the sample of bulk material to a separator may include generating a fluid flow through a passage between the meter and separator with an air source.

Routing the fluid flow from the compartment to the tank may include generating the fluid flow through a pneumatic distribution system. The pneumatic distribution system may include a first passage that extends between the meter and a distribution location, a second passage that extends between the compartment and the tank, and third conduit that extends between the meter to the compartment.

Generating the fluid flow through the pneumatic distribution system may include altering a configuration of at least one valve to selectively generate the fluid flow in the first passage, the second passage, or the third passage.

A fifth example may include the following.

A meter calibration system for calibrating a meter provided on an agricultural machine may include a tank to hold bulk material; a meter that is operable to dispense bulk material from the tank, the meter being in communication with the tank; a pneumatic distribution system that is configured to receive bulk material dispensed by the meter and that distributes bulk material to a distribution location via a fluid flow, the pneumatic distribution system including a cavity adjacent to an outlet of the meter that is configured to receive bulk material dispensed by the meter; and a weight sensor that is configured to sense a weight of the dispensed bulk material received into the cavity in the absence of a fluid flow within the pneumatic distribution system.

The meter calibration system may also include a controller that controls operation of the meter and determines a calibration factor for the meter using the sensed weight of the dispensed bulk material.

The controller may determine the calibration factor using a sensed weight of dispensed bulk material and a selected manner of operation of the meter.

The controller may control a fluid flow device to produce a fluid flow in the pneumatic distribution system after the weight sensor has sensed the weight of dispensed bulk material.

The fluid flow may transport dispensed bulk material to the environment.

The fluid flow may transport dispensed material to the tank.

The meter may include a plurality of meters. The pneumatic distribution system may include a plurality of passages. One of the plurality of passages may be associated with one of the plurality of meters, and each of the meters of the plurality of meters may be operable to dispense bulk material into the associated passage of the plurality of passages.

Each of the meters may operate selectively to dispense bulk material into the associated passage of the plurality of passages.

The cavity may include a plurality of cavities, and one of the cavities of the plurality of cavities may be associated with one of the passages of the plurality of passages.

A sixth example may include the following.

A computer-implemented method of calibrating a meter provided on an air seeder may include operating a meter to dispense a sample of bulk material stored in a tank into a portion of a pneumatic distribution system; sensing a weight of the sample of bulk material dispensed from the meter with a weight sensor; and calibrating the operation of the meter using the sensed weight of the sample of bulk material.

The computer-implemented method may also include generating a fluid flow in the pneumatic distribution system to transport the sample of bulk material out of the portion of pneumatic distribution system.

Generating a fluid flow in the pneumatic distribution system to transport the sample of bulk material out of the portion of pneumatic distribution system may include expelling the sample of bulk material from the pneumatic distribution system.

Generating a fluid flow in the pneumatic distribution system to transport the sample of bulk material out of the portion of pneumatic distribution system may include transporting the sample of bulk material to the tank.

Operating a meter to dispense a sample of bulk material stored in a tank into a portion of a pneumatic distribution system may include operating the meter a selected number of cycles.

Calibrating the operation of the meter may include determining a meter displacement value (MDV) using the selected number of cycles and the sensed weight of the sample bulk material and adjusting operation of the meter using the MDV.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/nonpermanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A container for collecting bulk material dispensed from a meter during a calibration operation, the container comprising:
  a canister comprising an open end to receive bulk material;
  a coupler configured to releasably couple to a meter; and
  at least one weight sensor extending between the canister and the coupler, the weight sensor configured to detect weight of the bulk material deposited into the canister via the open end,
  wherein the canister is moveable relative to the coupler, and further comprising a guide coupled to the coupler, the guide defining a direction of movement of the canister relative to the coupler.

2. The container of claim 1, further comprising a stop that limits movement of the canister relative to the coupler.

3. The container of claim 2, wherein the guide defines vertical movement of the canister relative to the coupler such that the canister is vertically movable relative to the coupler.

4. The container of claim 1, wherein the coupler comprises a flange extending along at least a portion of the open end.

5. The container of claim 1, further comprising a cavity formed between the coupler and the canister.

6. The container of claim 5, wherein the at least one weight sensor is disposed in the cavity.

7. The container of claim 1, wherein the weight sensor comprises a first end and a second end, wherein the first end of the weight sensor is connected to the coupler and the second end is connected to the canister.

8. The container of claim 7, wherein the first end and the second end of the weight sensor are laterally offset from each other.

9. The container of claim 1, further comprising an electrical connector, wherein the electrical connector is configured to communicate weight information associated with a weight of bulk material dispensed into the canister.

10. The container of claim 1, further comprising a memory, communicably coupled to the at least one weight sensor, that stores weight information associated with a weight of the bulk material dispensed into the canister.

11. The container of claim 1, wherein the meter comprises a plurality of meters, wherein the canister comprises a plurality of compartments, and wherein each compartment is positioned to receive bulk material from a corresponding meter of the plurality of meters.

12. A method for providing weight information of a bulk material dispensed by a meter into and sensed by a container coupled to the meter, the method comprising:
  coupling a container comprising a weight sensor to a meter such that bulk material dispensed from the meter is received into the container;
  sensing a weight of the dispensed bulk material received into the container with the weight sensor; and
  communicating the sensed weight of the bulk material, via electronic signals, to an electronic controller of the meter,
  wherein the container comprises a canister and a coupler moveable relative to the canister and wherein sensing a weight of the dispensed bulk material received into the container with the weight sensor comprises sensing an amount of displacement of the canister relative to the coupler in response to the bulk material received into the canister.

13. The method of claim 12, further comprising calibrating, with the electronic controller, the meter using the sensed weight of the bulk material.

14. The method of claim 12, wherein communicating the sensed weight of the bulk material, via electronic signals, to an electronic controller of the meter comprises transmitting the sensed weight with an electrical connector of the container.

15. The method of claim 12, wherein communicating the sensed weight of the bulk material, via electronic signals, to an electronic controller of the meter comprises wirelessly transmitting the sensed weight.

16. The method of claim 12, wherein the meter comprises an air seeder meter.

17. The method of claim 12, wherein the weight sensor comprises a load cell.

18. The method of claim 12, further comprising limiting an amount of displacement of the canister relative to the coupler.

19. A computer-implemented method performed by one or more processors for automatically calibrating a bulk material meter, the method comprising the following operations:

operating a bulk material meter to dispense an amount of bulk material into a container coupled to the meter, the container comprising an electronic weight sensor;

sensing, with the electronic weight sensor, a weight of the bulk material received into the container;

transmitting the sensed weight of the bulk material to an electronic controller of the meter; and calibrating the meter using the sensed weight of the bulk material, wherein the container comprises:

a coupler; and a canister movably coupled to the coupler, and wherein sensing, with an electronic weight sensor, a weight of the bulk material received into the container comprises sensing an amount of displacement of the canister relative to the coupler.

20. The computer-implemented method of claim 19, wherein operating a bulk material meter to dispense an amount of bulk material into a container coupled to the meter comprises operating the meter a selected number of cycles or for a selected period of time.

21. The computer-implemented method of claim 19, wherein transmitting the sensed weight of the bulk material to an electronic controller of the meter comprises transmitting the sensed weight of the bulk material via a wired electrical connection between the electronic weight sensor and the electronic controller of the meter.

22. The computer-implemented method of claim of claim 21, wherein the wired electrical connection comprises an electrical connector of the container.

23. The computer-implemented method of claim 19, wherein transmitting the sensed weight of the bulk material to an electronic controller of the meter comprises transmitting the sensed weight of the bulk material via a wireless electrical connection between the electronic weight sensor and the electronic controller of the meter.

24. The computer-implemented method of claim 19, wherein calibrating the meter using the sensed weight of the bulk material comprises altering a rate of operation of the meter.

25. The computer-implemented method of claim 19, wherein the meter is a volumetric meter.

26. The computer-implemented method of claim 19, wherein the electronic weight sensor comprises a plurality of electronic weight sensors and wherein sensing, with an electronic weight sensor, a weight of the bulk material received into the container comprises sensing a weight of the bulk material with the plurality of electronic weight sensors.

27. The computer-implemented method of claim 26, wherein sensing a weight of the bulk material with the plurality of electronic weight sensors comprises summing the sensed weights sensed by the plurality of electronic weight sensors.

* * * * *